(12) United States Patent
Hampel et al.

(10) Patent No.: US 10,091,815 B2
(45) Date of Patent: Oct. 2, 2018

(54) USER EQUIPMENT SILENCING BASED ON CLEAR CHANNEL ASSESSMENT IN SHARED SPECTRUM

(71) Applicant: QUALCOMM Incorporated, San Diego, CA (US)

(72) Inventors: Karl Georg Hampel, New York City, NY (US); Junyi Li, Chester, NJ (US); Vincent Douglas Park, Budd Lakes, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 15/213,156

(22) Filed: Jul. 18, 2016

(65) Prior Publication Data

US 2017/0171885 A1    Jun. 15, 2017

Related U.S. Application Data

(60) Provisional application No. 62/260,081, filed on Nov. 25, 2015, provisional application No. 62/260,061, filed on Nov. 25, 2015.

(51) Int. Cl.
*H04J 3/00* (2006.01)
*H04W 74/00* (2009.01)
(Continued)

(52) U.S. Cl.
CPC ......... *H04W 74/008* (2013.01); *H04L 5/0007* (2013.01); *H04L 5/14* (2013.01); *H04W 74/04* (2013.01)

(58) Field of Classification Search
CPC .... H04L 5/14; H04B 3/23; H04B 3/20; H04B 3/234
See application file for complete search history.

(56) References Cited

U.S. PATENT DOCUMENTS

| 7,496,067 B2* | 2/2009 | Qiu | H04W 28/26 370/329 |
| 2003/0012176 A1* | 1/2003 | Kondylis | H04W 28/16 370/348 |

(Continued)

OTHER PUBLICATIONS

ISA/EP, International Search Report and Written Opinion of the International Searching Authority, Int'l Application No. PCT/US2016/062918, dated Feb. 23, 2017, European Patent Office, Rijswijk, NL, 13 pgs.

(Continued)

*Primary Examiner* — Siren Wei
(74) *Attorney, Agent, or Firm* — Clint R. Morin; Holland & Hart

(57) ABSTRACT

Methods, systems, and devices for wireless communication are described. A wireless device communicating critical or latency sensitive information may determine that a clear channel assessment (CCA) has failed in a shared radio frequency (RF) spectrum band. The device may then transmit a silencing signal in a managed RF spectrum band, and switch to communicating in the managed band from transmitting in the shared band. Other wireless devices communicating with the first device may receive the silencing signal and may also switch to the managed RF spectrum band. Based on the silencing signal, user equipments (UEs) not associated with the critical communications, but also operating in the managed band, may suspend transmissions in the managed band (e.g., uplink (UL) data), although they may still receive transmissions in the managed band (e.g., downlink (DL) data).

44 Claims, 15 Drawing Sheets

(51) Int. Cl.
*H04L 5/00* (2006.01)
*H04W 74/04* (2009.01)
*H04L 5/14* (2006.01)

(56) References Cited

U.S. PATENT DOCUMENTS

| | | | |
|---|---|---|---|
| 2009/0257388 A1* | 10/2009 | Khandekar | H04W 16/14 370/329 |
| 2011/0222398 A1* | 9/2011 | Ribeiro | H04W 74/0816 370/230 |
| 2013/0229998 A1* | 9/2013 | Noh | H04L 5/001 370/329 |
| 2014/0362780 A1* | 12/2014 | Malladi | H04W 16/14 370/329 |
| 2016/0088642 A1* | 3/2016 | Yang | H04W 24/08 455/451 |
| 2016/0192396 A1* | 6/2016 | Ng | H04W 74/0808 370/329 |
| 2017/0208477 A1 | 7/2017 | Hampel et al. | |

OTHER PUBLICATIONS

Ratasuk et al., "License-Exempt LTE Deployment in Heterogeneous Network," IEEE, International Symposium on Wireless Communication Systems (ISWCS), Aug. 28, 2012, pp. 246-250, XP032263759, DOI: 10.1109/ISWCS. 2012.6328367, Institute of Electrical and Electronics Engineers.

* cited by examiner

USER EQUIPMENT SILENCING BASED ON CLEAR CHANNEL ASSESSMENT IN SHARED SPECTRUM

CROSS REFERENCES

The present application for patent claims priority to U.S. Provisional Patent Application No. 62/260,081 by Hampel et al., entitled "User Equipment Silencing Based on Clear Channel Assessment in Unlicensed Spectrum," filed Nov. 25, 2015, assigned to the assignee hereof, and to U.S. Provisional Patent Application No. 62/260,061 by Hampel et al., entitled "User Equipment Silencing Based on Transmission Failure in Unlicensed Spectrum," filed Nov. 25, 2015, assigned to the assignee hereof.

BACKGROUND

The following relates generally to wireless communication, and more specifically to user equipment (UE) silencing based on clear channel assessment (CCA) in shared or unlicensed spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as UEs.

In some cases, wireless devices may communicate critical or latency sensitive information in a shared radio frequency (RF) spectrum band. However, communications in a shared band may be subject to contention based access procedures that prevent a device from accessing a channel. This may result in disruptions to critical signaling between wireless devices, such as control signaling.

SUMMARY

A wireless device communicating critical or latency sensitive information may determine that a clear channel assessment (CCA) has failed in a shared radio frequency (RF) spectrum band (e.g., an RF spectrum band shared by a number of different licensees, a shared RF spectrum band, or other RF spectrum in which a wireless device contends for access with other wireless devices). The device may then transmit a silencing signal in a managed RF spectrum band (e.g., a licensed RF spectrum band), and switch to communicating in the managed band from transmitting in the shared band. Other wireless devices communicating with the first device may receive the silencing signal and may also switch to the managed RF spectrum band. Based on the silencing signal, user equipments (UEs) not associated with the critical communications, but also operating in the managed band, may suspend transmissions in the managed band (e.g., uplink (UL) data), although they may still receive transmissions in the managed band (e.g., downlink (DL) data).

A method of wireless communication is described. The method may include determining that a CCA in a shared RF spectrum band has failed, a radio access technology (RAT) operating in the shared RF spectrum band is synchronized with a RAT operating in a managed RF spectrum band, transmitting a silencing signal in the managed RF spectrum band based at least in part on the determination and transmitting a message in the managed RF spectrum band based at least in part on the silencing signal.

An apparatus for wireless communication is described. The apparatus may include means for determining that a CCA in a shared RF spectrum band has failed, a RAT operating in the shared RF spectrum band is synchronized with a RAT operating in a managed RF spectrum band, means for transmitting a silencing signal in the managed RF spectrum band based at least in part on the determination and means for transmitting a message in the managed RF spectrum band based at least in part on the silencing signal.

A further apparatus is described. The apparatus may include a processor, memory in electronic communication with the processor, and instructions stored in the memory. The instructions may be operable to cause the processor to determine that a CCA in a shared RF spectrum band has failed, a RAT operating in the shared RF spectrum band is synchronized with a RAT operating in a managed RF spectrum band, transmit a silencing signal in the managed RF spectrum band based at least in part on the determination and transmit a message in the managed RF spectrum band based at least in part on the silencing signal.

A non-transitory computer-readable medium for wireless communication is described. The non-transitory computer-readable medium may include instructions to cause a processor to determine that a CCA in a shared RF spectrum band has failed, where a RAT operating in the shared RF spectrum band is synchronized with a RAT operating in a managed RF spectrum band, transmit a silencing signal in the managed RF spectrum band based on the determination and transmit a message in the managed RF spectrum band based on the silencing signal.

Some examples of the method, apparatus, or non-transitory computer-readable medium described above may further include processes, features, means, or instructions for determining that a subsequent CCA in the shared RF spectrum band has succeeded after the CCA. Some examples of the method, apparatus, or non-transitory computer-readable medium described above may further include processes, features, means, or instructions for transmitting a subsequent message in the shared RF spectrum band based on the determination that the subsequent CCA has succeeded.

Some examples of the method, apparatus, or non-transitory computer-readable medium described above may further include processes, features, means, or instructions for determining that a subsequent CCA in the shared RF spectrum band has failed after the CCA. Some examples of the method, apparatus, or non-transitory computer-readable medium described above may further include processes, features, means, or instructions for transmitting a subsequent silencing signal in the managed RF spectrum band based on the determination that the subsequent CCA has failed. Some examples of the method, apparatus, or non-transitory computer-readable medium described above may further include processes, features, means, or instructions for transmitting a subsequent message in the shared RF spectrum band based on the subsequent silencing signal.

Some examples of the method, apparatus, or non-transitory computer-readable medium described above may further include processes, features, means, or instructions for performing the CCA in a time slot prior to a first subframe of a radio frame, where the message is transmitted in the first subframe.

In some examples of the method, apparatus, or non-transitory computer-readable medium described above, transmitting the silencing signal in the managed RF spectrum band includes transmitting the silencing signal during a first time slot of a subframe of a radio frame structure of the managed RF spectrum band based on the determination.

In some examples of the method, apparatus, or non-transitory computer-readable medium described above, the silencing signal includes a multi-tone orthogonal frequency division multiplexing (OFDM) signal, a pseudo-noise (PN) signal, or a constant amplitude zero autocorrelation (CA-ZAC) signal.

In some examples of the method, apparatus, or non-transitory computer-readable medium described above, the message includes information for a mission critical application or for a control application.

In some examples of the method, apparatus, or non-transitory computer-readable medium described above, the managed RF spectrum band includes a portion of a system bandwidth of a wireless wide area network (WWAN).

In some examples of the method, apparatus, or non-transitory computer-readable medium described above, the time resources of the managed RF spectrum band are organized according to a time division duplex (TDD) configuration.

A method of wireless communication is described. The method may include identifying resources for an UL transmission associated with a RAT operating in a managed RF spectrum band, receiving a silencing signal in the managed RF spectrum band during a time period including the identified resources, the silencing signal is based at least in part on a determination that a CCA has failed, and a second RAT operating in a shared RF spectrum band is synchronized with the first RAT operating in the managed RF spectrum band and suspending transmission in the managed RF spectrum band during the time period based at least in part on the silencing signal.

An apparatus for wireless communication is described. The apparatus may include means for identifying resources for an UL transmission associated with a RAT operating in a managed RF spectrum band, means for receiving a silencing signal in the managed RF spectrum band during a time period including the identified resources, the silencing signal is based at least in part on a determination that a CCA has failed, and a second RAT operating in a shared RF spectrum band is synchronized with the first RAT operating in the managed RF spectrum band and means for suspending transmission in the managed RF spectrum band during the time period based at least in part on the silencing signal.

A further apparatus is described. The apparatus may include a processor, memory in electronic communication with the processor, and instructions stored in the memory. The instructions may be operable to cause the processor to identify resources for an UL transmission associated with a RAT operating in a managed RF spectrum band, receive a silencing signal in the managed RF spectrum band during a time period including the identified resources, the silencing signal is based at least in part on a determination that a CCA has failed, and a second RAT operating in a shared RF spectrum band is synchronized with the first RAT operating in the managed RF spectrum band and suspend transmission in the managed RF spectrum band during the time period based at least in part on the silencing signal.

A non-transitory computer-readable medium for wireless communication is described. The non-transitory computer-readable medium may include instructions to cause a processor to identify resources for an UL transmission associated with a RAT operating in a managed RF spectrum band, receive a silencing signal in the managed RF spectrum band during a time period including the identified resources, where the silencing signal is based on a determination that a CCA has failed, and where a second RAT operating in a shared RF spectrum band is synchronized with the first RAT operating in the managed RF spectrum band and suspend transmission in the managed RF spectrum band during the time period based on the silencing signal.

Some examples of the method, apparatus, or non-transitory computer-readable medium described above may further include processes, features, means, or instructions for receiving an UL grant, where the resources are identified based on the UL grant.

Some examples of the method, apparatus, or non-transitory computer-readable medium described above may further include processes, features, means, or instructions for receiving a DL transmission during the time period based on the DL grant.

Some examples of the method, apparatus, or non-transitory computer-readable medium described above may further include processes, features, means, or instructions for receiving an UL grant for a subsequent time period. Some examples of the method, apparatus, or non-transitory computer-readable medium described above may further include processes, features, means, or instructions for resuming transmission in the managed RF spectrum band during the subsequent time period based on the UL grant.

A method of wireless communication is described. The method may include receiving a silencing signal in a managed RF spectrum band, the silencing signal is based at least in part on a determination that a CCA has failed, and a first RAT operating in the managed RF spectrum band is synchronized with a second RAT operating in a shared RF spectrum band and switching from receiving transmissions from a source of the silencing signal in the shared RF spectrum band to receiving transmissions from the source of the silencing signal in the managed RF spectrum band based at least in part on the silencing signal.

An apparatus for wireless communication is described. The apparatus may include means for receiving a silencing signal in a managed RF spectrum band, the silencing signal is based at least in part on a determination that a CCA has failed, and a first RAT operating in the managed RF spectrum band is synchronized with a second RAT operating in a shared RF spectrum band and means for switching from receiving transmissions from a source of the silencing signal in the shared RF spectrum band to receiving transmissions from the source of the silencing signal in the managed RF spectrum band based at least in part on the silencing signal.

A further apparatus is described. The apparatus may include a processor, memory in electronic communication with the processor, and instructions stored in the memory. The instructions may be operable to cause the processor to receive a silencing signal in a managed RF spectrum band, the silencing signal is based at least in part on a determination that a CCA has failed, and a first RAT operating in the managed RF spectrum band is synchronized with a second RAT operating in a shared RF spectrum band and switch from receiving transmissions from a source of the silencing signal in the shared RF spectrum band to receiving transmissions from the source of the silencing signal in the managed RF spectrum band based at least in part on the silencing signal.

A non-transitory computer-readable medium for wireless communication is described. The non-transitory computer-readable medium may include instructions to cause a processor to receive a silencing signal in a managed RF spectrum band, where the silencing signal is based on a determination that a CCA has failed, and where a first RAT operating in the managed RF spectrum band is synchronized with a second RAT operating in a shared RF spectrum band and switch from receiving transmissions from a source of the silencing signal in the shared RF spectrum band to receiving transmissions from the source of the silencing signal in the managed RF spectrum band based on the silencing signal.

Some examples of the method, apparatus, or non-transitory computer-readable medium described above may further include processes, features, means, or instructions for powering up a radio for the managed RF spectrum band. Some examples of the method, apparatus, or non-transitory computer-readable medium described above may further include processes, features, means, or instructions for listening, using the radio, for the silencing signal in the managed RF spectrum band during a first portion of a subframe of a radio frame structure.

DETAILED DESCRIPTION

Figure 1:
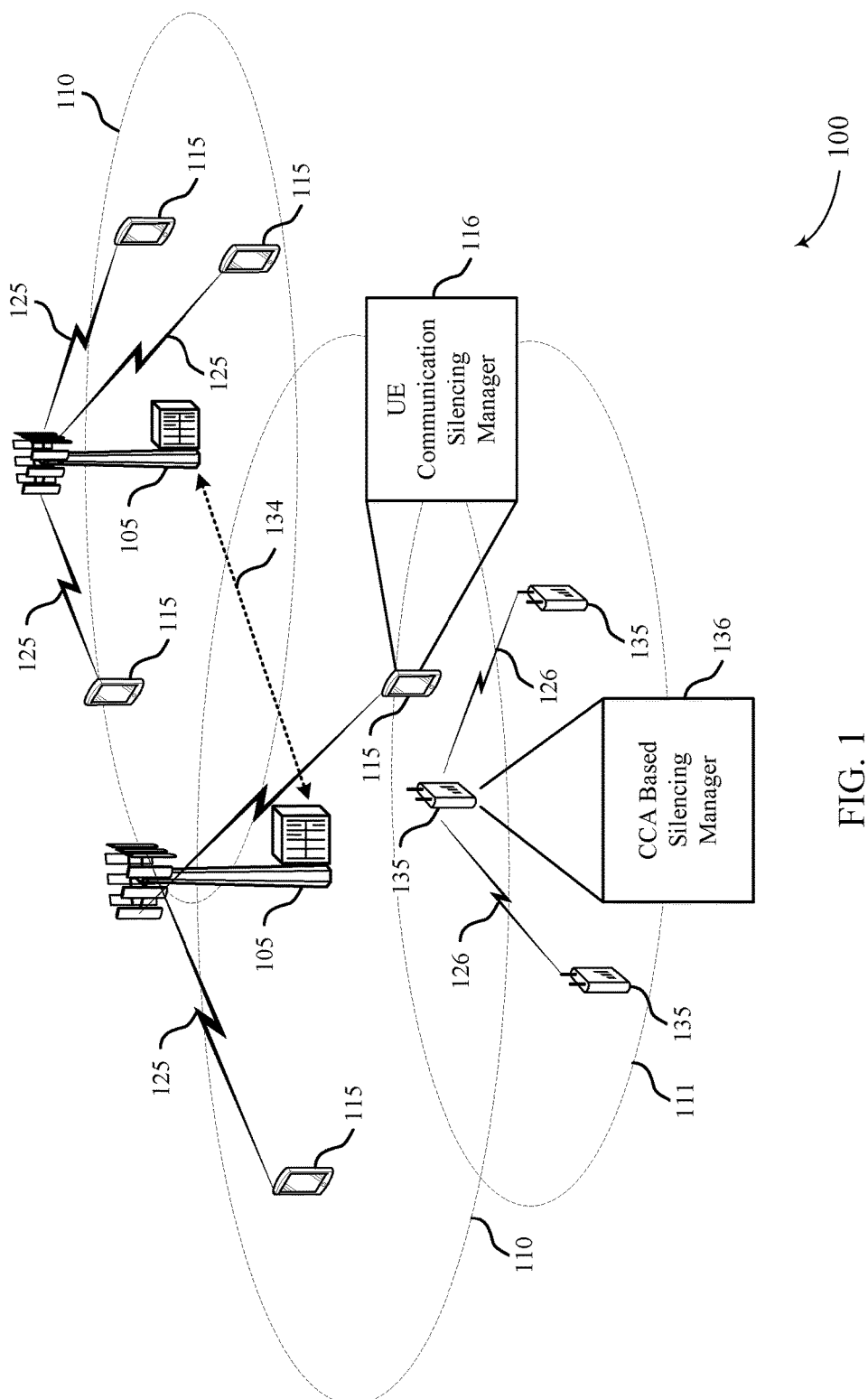
FIG. 1 illustrates an example of a wireless communications system that supports user equipment (UE) silencing based on clear channel assessment (CCA) in shared spectrum in accordance with aspects of the present disclosure.

Shared radio frequency (RF) spectrum may offer a large amount of bandwidth for a particular application to meet a high capacity demand at low cost. A shared RF spectrum band may include an unlicensed RF spectrum band (or "unlicensed band"), an RF spectrum band for which multiple licensees have the right to access the spectrum, or other RF spectrum bands for which wireless devices contend for access. However, traffic in a shared RF spectrum band (or "shared band") may be subject to interference from other systems operating in the same shared band. Such interference may be detrimental to an application that has low packet error rate or latency tolerance. For example, wireless devices engaged in a mission-critical application that communicate using a shared band may be subject to interference from other wireless devices operating in the same band that are nearby. Transmissions may fail due to this interference. Managed RF spectrum bands (or "managed bands) may include licensed RF spectrum bands, such as RF spectrum bands administered by a regulator that has provided a license for an operator to provide services that use the RF spectrum band and are centrally managed by the operator. Using a managed RF spectrum band provided by an operator for the application rather than a shared band may address packet error rates or latencies associated with using the shared band, but may be uneconomical for the particular application.

In a mission-critical application, a wireless device may use a shared band for an initial sequence of transmissions of a packet. Based on a listen-before-talk (LBT) procedure such as a clear channel assessment (CCA), the device may determine that the shared channel is not available. The device may then switch to communicating in a managed band. In order to reduce interference from user equipments (UEs) operating in managed spectrum, the transmitter may send a silencing signal at the beginning of the subframe, which may align with a time slot associated with a base station control channel. If the UEs receive and decode the silencing signal they may suspend uplink (UL) transmissions for the duration of the subframe.

To facilitate switching to a managed band, mission-critical traffic may operate using a mutually synchronized subframe structure with cellular traffic of a cellular network operating in managed spectrum. That is, wireless devices operating in shared spectrum may synchronize their operations with a wide area network (WAN) that operates in managed spectrum. This may allow the wireless devices operating in shared spectrum to switch to managed spectrum without disruption of the timing of mission-critical communications.

Aspects of the disclosure are initially described in the context of a wireless communication system. Examples are then described in which a wireless device performs a CCA, transmits a silencing signal, and switches to managed spectrum. Aspects of the disclosure are further illustrated by and described with reference to apparatus diagrams, system diagrams, and flowcharts that relate to UE silencing based on CCA in shared spectrum.

FIG. 1 illustrates an example of a wireless communications system 100 that supports UE silencing based on CCA in shared spectrum in accordance with various aspects of the present disclosure. The wireless communications system 100 includes base stations 105, UEs 115, and a core network 130. In some examples, the wireless communications system 100 may include a Long Term Evolution (LTE)/LTE-Advanced (LTE-A) network. Wireless communications system 100 may support a local network of wireless devices 135 that may switch from a shared to a managed RF spectrum band if a CCA failure is detected.

For example, a first wireless device 135 operating in the wireless communications system 100 may transmit on a shared RF spectrum band to one or more other wireless devices 135. Prior to transmission, the first wireless device may perform a CCA (e.g., prior to the start of a subframe). If the shared channel is busy, the first wireless device 135 may transmit a silencing signal on a managed band. UEs 115 that receive the silencing signal may refrain from UL transmissions during the subframe in which the silencing signal was sent, and the first wireless device 135 may transmit to the one or more wireless devices 135 using the managed band during the subframe. A subframe may refer to a division of a frame of the wireless communication system 100. A frame may refer to a discrete set of physical resources that may be used to communicate data using the wireless communication system 100. A frame may include both time domain resources and frequency domain resources. For example, the duration of one LTE radio frame may be 10 ms. One frame may be divided into 10 subframes of 1 ms each, and each subframe may be divided into two slots of 0.5 ms each. Each slot may contain six or seven OFDM symbols, depending on a cyclic prefix (CP) length. In an LTE communication network, scheduling of physical resources may, in some examples, be done on a subframe by subframe basis, and be for uplink and/or downlink data.

In some cases, wireless devices may switch from operating using a first radio access technology (RAT) when operating in the shared band to using a second RAT when operating in the managed band. For example, the first RAT may use a contention based access procedure. In some cases, the first RAT and the second RAT may be the same RAT, or different versions or releases of the same RAT. Also, the one or more RATs used by wireless devices 135 may be the same or different from a RAT used by UEs 115 and base station 105. In some cases, the managed band may be a licensed RF spectrum band such that the second RAT may use a scheduled access procedure to access the licensed RF spectrum band for communication.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. UEs 115 may include a UE communication silencing manager 116, which may identify resources for an UL transmission associated with a first RAT operating in a managed RF spectrum band, receive a silencing signal in the managed RF spectrum band for a time period including the identified resources, where the silencing signal is based on a determination that a transmission in a shared RF spectrum band has failed, and where a second RAT operating in the shared RF spectrum band is synchronized with the first RAT operating in the managed RF spectrum band, and suspend transmission in the managed RF spectrum band during the time period based on the silencing signal. The UE communication silencing manager 116 may also be an example of aspects of the UE communication silencing manager 1205 described with reference to FIG. 12.

Wireless communications system 100 may include a network of wireless devices 135 that operate in coverage area 111 using communication links 126. For example, wireless devices 135 may be controllers, sensors, or actuators within a factory automation network. In other examples, wireless devices may be a part of a home automation network, or an internet of things (JOT) network.

Wireless devices 135 may include CCA based silencing manager 136, which may determine that a CCA a shared RF spectrum band has failed, transmit a silencing signal in an managed RF spectrum band based on the determination, and communicate in the managed RF spectrum band based on the silencing signal. The CCA based silencing manager 136 may also receive a silencing signal in a managed RF spectrum band, and switch from communicating with a source of the silencing signal in the shared RF spectrum band to communicating with the source of the silencing signal in the managed RF spectrum band based on the silencing signal. The CCA based silencing manager 136 may also be an example of aspects of the CCA based silencing manager 805 described with reference to FIG. 8.

A wireless device 135, UE 115, or base station 105 may operate in a shared or shared frequency spectrum. These devices may perform a CCA prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter that may result in an indication that the CCA has failed. A CCA may also include detection of specific sequences that indicate use of the channel. For example, another device may transmit a specific preamble prior to transmitting a data sequence. Thus, if a CCA indicates that a channel is being used by another transmitting device, the CCA may be determined to have failed.

In some cases, transmission failure and retransmission may be determined based on a hybrid automatic repeat request (HARQ) procedure. HARQ may be a method of ensuring that data is received correctly over a wireless communication link 125. HARQ may include a combination of error detection (e.g., using a CRC), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125.

In some cases, wireless communications system 100 may utilize one or more enhanced component carrier (eCC)s. An eCC may be characterized by one or more features including flexible bandwidth, different transmission time interval (TTI)s, and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or other shared spectrum (e.g., where more than one operator is licensed to use the spectrum).

An eCC characterized by flexible bandwidth may include one or more segments that may be utilized by UEs 115 that do are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic TDD operation (e.g., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARM) related control information.

Accordingly, a wireless device 135 communicating critical or latency sensitive information may determine that a CCA has failed in a shared RF spectrum band. The device may then transmit a silencing signal in a managed RF spectrum band, and switch to communicating in the managed band. Other wireless devices communicating with the first device may receive the silencing signal and may also switch to the managed RF spectrum band. Based on the silencing signal, UEs 115 not associated with the critical communications and operating in the managed band may suspend transmissions, although they may still receive DL data.

Figure 2:
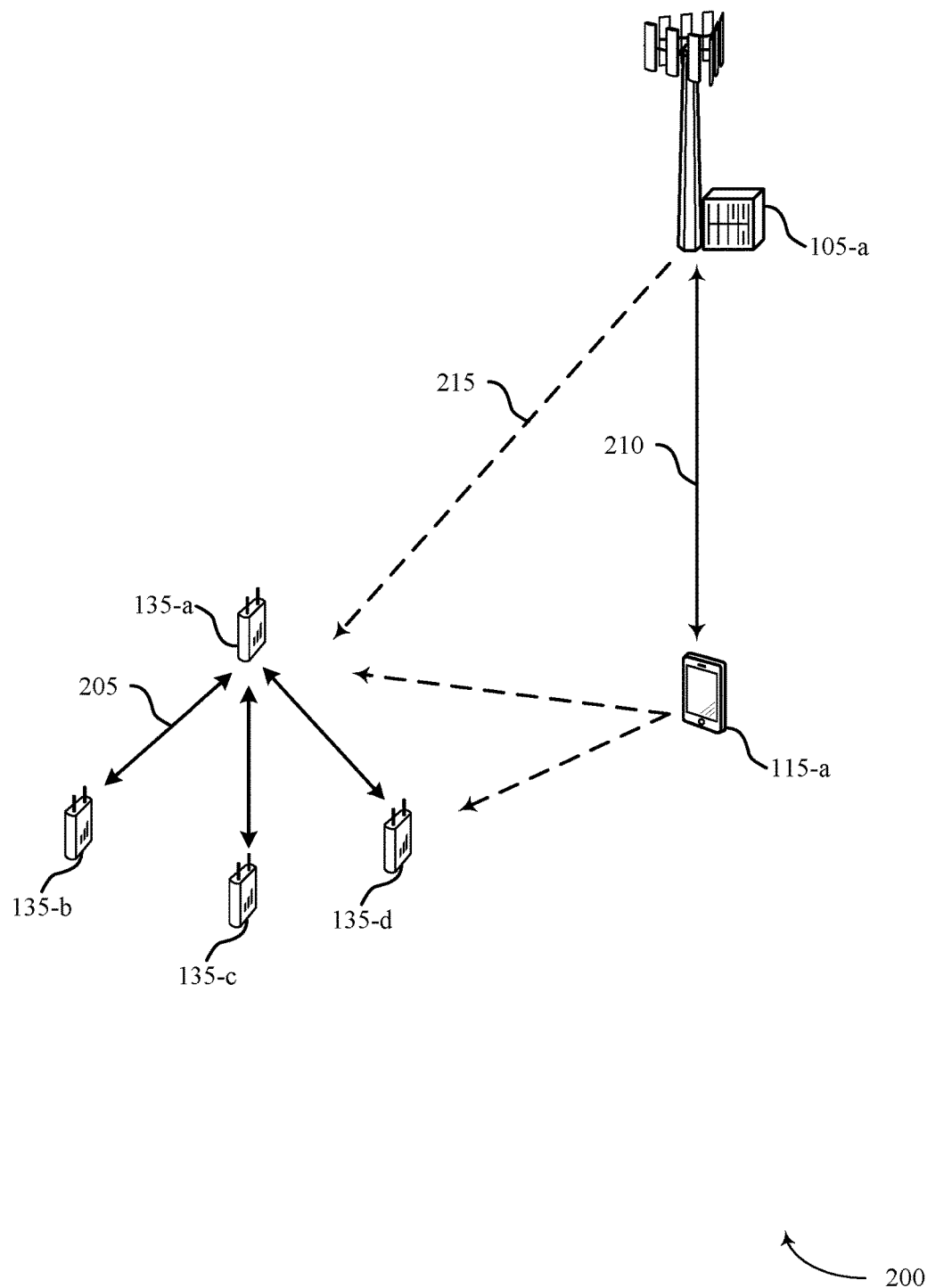
FIG. 2 illustrates an example of a wireless communications system that supports UE silencing based on CCA in shared spectrum in accordance with aspects of the present disclosure.

FIG. 2 illustrates an example of a wireless communications system 200 that supports UE silencing based on CCA in shared spectrum in accordance with various aspects of the present disclosure. Wireless communications system 200 may include base station 105-a and UE 115-a, which may be examples of the corresponding devices described with reference to FIG. 1. Wireless communications system 200 may support a local network of wireless devices 135 that switch from a shared to a managed RF spectrum band if a CCA failure is detected. In some cases, the local network may support mission-critical or latency-sensitive information (such as control information for a closed loop control system as in a factory automation or home automation network). The local network may also be referred to as a mission-critical network or a critical information network.

In some cases, wireless device 135-a may transmit mission-critical (e.g., latency sensitive) information via a wireless link 205 to wireless devices 135-b in a shared RF spectrum band using a first RAT. Base station 105-a may communicate with UE 115-a via wireless link 210 using a second RAT in managed RF spectrum, which may potentially cause interference 215 with communications of the wireless devices 135 (e.g., if wireless devices 135 and UE 115-a were to transmit on the same frequency at the same time). Operations using the first RAT may be synchronized to operations using the second RAT. That is communication in a shared band may be synchronized to operations, including communications, in a managed band used by base station 105-a and UE 115-a.

In some cases, wireless device 135-a that uses the first RAT may perform CCA before transmitting to wireless device 135-b, wireless device 135-c, wireless device 135-d, or another wireless device 135 in a local network (e.g., a factory or home automation network). If the channel on the shared band is busy, wireless device 135-a may transmit to wireless device 135-b in the managed band instead of the shared band. When transmitting on the managed band, wireless device 135-a may use a second RAT. In some cases, the second RAT may be the same as the first RAT.

Prior to transmitting in the managed RF spectrum band supporting a radio frame structure, wireless device 135-a may transmit a silencing signal at the beginning of a subframe, for example in the first slot of the subframe during which the wireless device 135-a will transmit a message. The silencing signal may occur during the same time period as a physical downlink control channel (PDCCH) signal of base station 105-a. Neighboring wireless devices on the managed RF spectrum band, such as UE 115-a, may attempt to decode both the PDCCH signal and the silencing signal. In some cases, the second RAT used by wireless device 135-a may be the same as a RAT being used by UE 115-a, or it may be different.

If UE 115-a, operating on the managed band, identifies the silencing signal, it may suspend UL transmission for the duration of the subframe. By suspending transmission for the subframe, UE 115-a may reduce possible interference for wireless device 135-a. If UE 115-a does not receive the silencing signal, or otherwise does not decode the silencing signal, UE 115-a may continue with UL transmission. If UE 115-a refrains from UL transmission, UE 115-a may continue to receive DL information from base station 105-a. After transmitting for the subframe on the managed cellular network, wireless device 135-a may then continue to transmit on the shared network. In this example, a frame may be an example of a TTI, a time slot, or a subframe.

In one example, a wireless system may utilize TDD-based resource partitioning of both a shared RF spectrum band and a managed RF spectrum band. In this example, the information being transmitted may be mission-critical (e.g., latency sensitive), and therefore interference of the information may lead to detrimental effects of a system.

In some cases, the wireless network may be a factory automation network, where the system being controlled by the factory automation network may be, for example, a production line. The wireless network may utilize a mutually synchronized frame structure for the managed RF spectrum band and the shared RF spectrum band, which may be further synchronized with cellular traffic. However, the cellular network may support extended links, for example from UE 115-a within the range of the factory automation network to base station 105-a outside the range of the factory automation network.

If wireless device 135-a determines that a channel in the shared band is busy, wireless device 135-a may transmit its information, which may be mission-critical, in the managed band. In some cases, to reduce further transmission interference, it may be appropriate to silence neighboring devices operating in the managed band. However, it may be appropriate for only the managed RF spectrum band transmissions within the vicinity of the critical information network to be silenced, for example by determining a threshold at which transmission interference may cause signal loss. For network infrastructure nodes supporting the cellular traffic, such as base station 105-a, this may be achieved by keeping sufficient distance between base station 105-a and wireless device 135-a. However, for a wireless device on the managed RF spectrum band, for example UE 115-a, wireless device 135-a may transmit an Over-The-Air silencing signal in the managed spectrum prior to using the managed spectrum for mission-critical traffic. In this example of a cellular TDD system, the silencing signal may be transmitted during time slots where UE 115-a may expect DL traffic. This may allow UE 115-a to receive and decode the silencing signal.

If UE 115-a decodes the silencing signal, UE 115-a may suspend transmission for a predefined time interval, for example a time slot, subframe, or a TTI, which may last for as long as wireless device 135-a utilizes the shared RF spectrum band. During the silenced period, wireless device 135-a may transmit on the managed RF spectrum band uninterrupted (e.g., by interference 215). In some cases, interference 215 from base station 105-a may not be as significant as that from UE 115-a, for example because UE 115-a is located closer to the wireless devices 135.

In some cases, base station 105-a may interpret silence of UE 115-a as an outage, which may be handled by ARQ or HARQ mechanisms. If base station 105-a engages in transmissions during the silenced time interval, UE 115-a may receive the DL communications. However, in some cases, UE 115-a may not be able to receive a signal of base station 105-a signal due to being over-powered by the mission-critical traffic. If so, a missed signal from base station 105-a may also be corrected by existing ARQ or HARQ mechanisms.

The critical information network and the cellular network may use a mutually synchronized frame structure. For example, the critical information network may be synchronized to the cellular network to facilitate switching from the shared band to the managed band. Synchronization of the two networks may cause the decoding of a transmitted silencing signal to be reduced to short, periodic time slots. Furthermore, suspension of uplink cellular traffic may be limited to the time interval used by the critical information network in the managed band.

Figure 3:
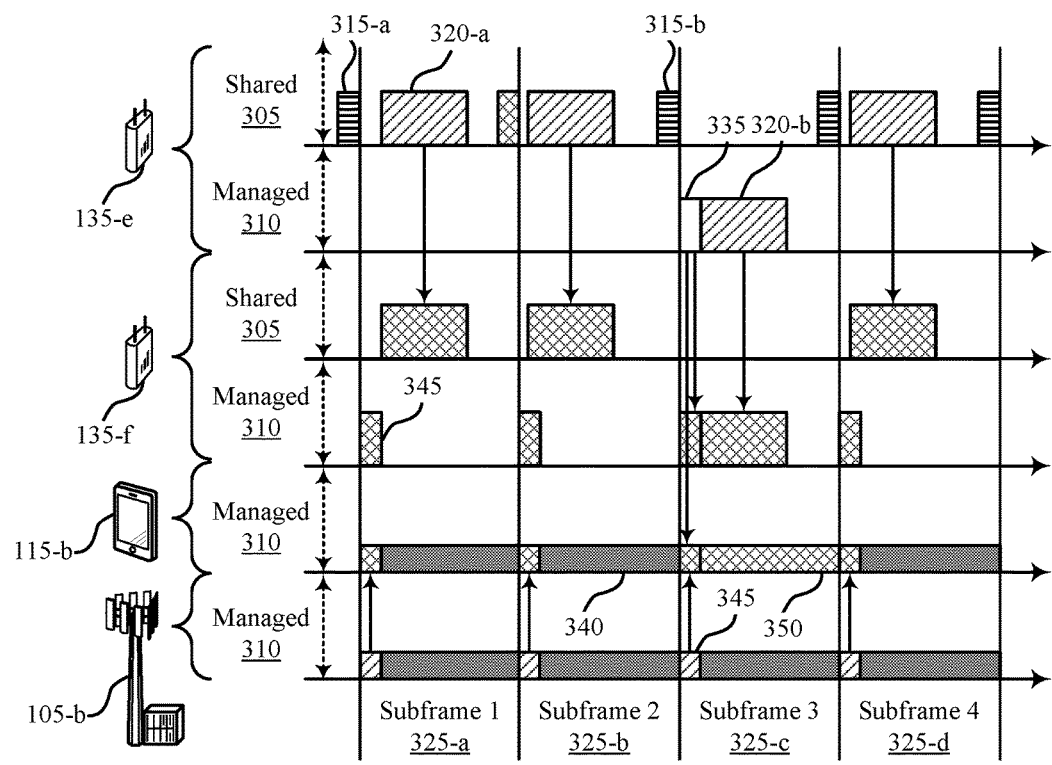
FIG. 3 illustrates an example of a timing diagram that illustrates UE silencing based on CCA in shared spectrum in accordance with aspects of the present disclosure.

FIG. 3 illustrates an example of timing diagram 300 for UE silencing based on CCA in shared spectrum in accordance with various aspects of the present disclosure. In some cases, UE transmission suspension in managed band 310 may represent aspects of techniques performed by a UE 115, base station 105, or wireless device 135 as described with reference to FIGS. 1 through 2.

Wireless device 135-e and wireless device 135-f may be operating in a shared band 305 for mission-critical transmission. UE 115-b may operate on the managed band 310 and communicate with base station 105-b (which may be located far away from the critical information network). Before wireless device 135-e transmits to wireless device 135-f, wireless device 135-e may perform CCA 315-a in a dedicated time slot prior to subframe 325-a where data are to be sent. If the channel is idle, wireless device 135-e may send transmission 320-a in the following time slot in the shared band 305. However, if CCA 315-b indicates that the shared band 305 is busy, wireless device 135-e may transmit a silencing signal 335 in the managed band 310 at the beginning of a subsequent subframe 325-c, followed by transmission 320-b (also in the managed band 310).

UE 115-b may transmit and receive during unrestricted time period 340 in the managed band 310. However, UE 115-b may also listen for control information and silencing signal 335 at the start of each subframe 325. If UE 115-b identifies silencing signal 335, UE 115-b may suspend UL transmissions for the remainder of subframe 325-c during restricted time period 350. UE 115-c may still receive DL control message 345 from base station 105-b for the duration of subframe 325-c. During other times, UE 115-b may conduct UL or DL traffic with base station 105-b. Suspending a transmission of UE 115-b in subframe 325-c may allow wireless device 135-e to transmit in managed band 310 without interference.

Silencing signal 335 may be transmitted at the beginning of each subframe 325 during a period used by base station 105-b for DL control message 345. All of subframe 325 may be utilized by cellular traffic in the absence of mission-critical traffic.

The silencing signal 335 may include one or more bits of information. The silencing signal 335 may be spread over a portion or all of the managed band 310. Using a large band for the silencing signal 335 may lower a detection threshold of UE 115-b due to the processing gain associated with spreading, which may make the operation of mission-critical traffic more robust. In some cases, the silencing signal comprises a multi-tone orthogonal frequency division multiplexing (OFDM) signal, a pseudo-noise (PN) signal, or a constant amplitude zero autocorrelation (CAZAC) signal. The signal may represent a single bit of information, or ins some cases, may include more than one bit.

The silencing signal 335 may also be received by wireless device 135-f. In some cases, wireless device 135-f may treat the reception of the silencing signal 335 as an indicator to use the managed band 310 for reception. In some cases, if wireless device 135-f does not receive the silencing signal 335, wireless device 135-f may power down a radio in managed band 310 for the remainder of the subframe 325, which may conserve power.

In some cases, wireless device 135-f may be scheduled for a traffic burst in one of the subframes 325. Wireless device 135-f may respond to a transmission, which wireless device 135-f may have received from wireless device 135-e. In some cases, the response from wireless device 135-f may occur in the same subframe 325, without wireless device 135-f performing CCA. In this case, the transmission may still be protected by the clearance of UE 115-b traffic for all of subframe 325. In some cases, wireless device 135-e may communicate at the same time with multiple correspondents in each subframe 325 using multiplexing methods such as frequency division or code division multiplexing.

Some aspects of this disclosure may be applied to cellular TDD systems where the silencing signal falls on a time slot used by a base station 105 to transmit a control signal such as a PDCCH. Some aspects of this disclosure may be applied to cellular FDD systems where a UE 115 uses a managed band for device-to-device (D2D) communications, in addition to conducting UL traffic to the network.

Figure 4:
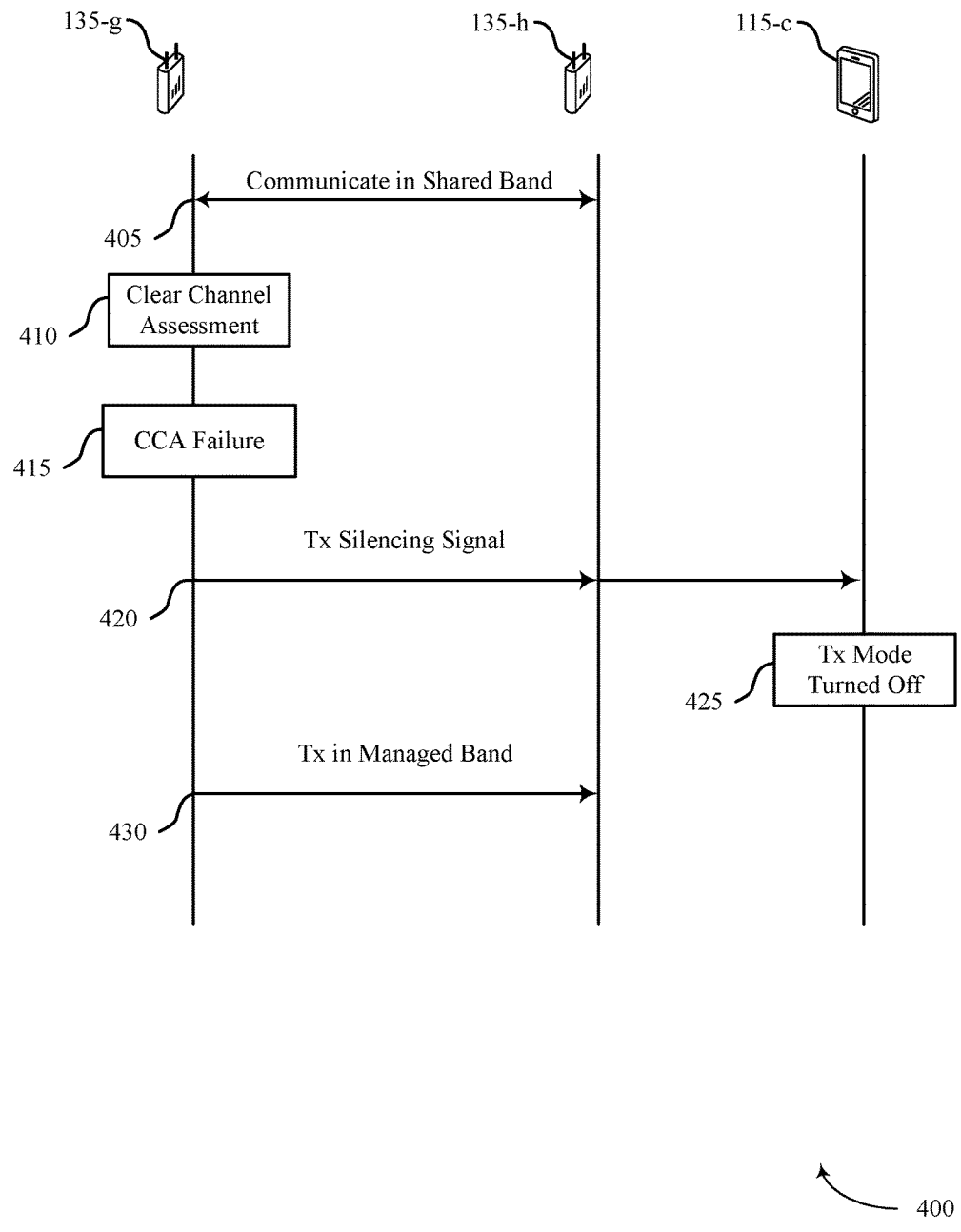
FIG. 4 illustrates an example of a process flow in a system that supports UE silencing based on CCA in shared spectrum in accordance with aspects of the present disclosure.

FIG. 4 illustrates an example of a process flow 400 for UE silencing based on CCA in shared spectrum in accordance with various aspects of the present disclosure. Process flow 400 may include wireless devices 135-g and 135-h, as well as UE 115-a, which may be examples of the corresponding devices described with reference to FIG. 1 through 3.

At step 405, wireless device 135-g may communicate with wireless device 135-h in a shared band. Wireless device 135-g may perform a CCA in the shared band prior to communicating and may have determined that the shared RF spectrum band is available. Wireless device 135-g may also communicate with additional wireless devices 135 (not shown). In some cases, the communication between wireless devices 135 is mission-critical communication such as closed loop control communications in a factory or home automation network.

At step 410, wireless device 135-g may perform a CCA before transmitting to wireless device 135-h during a subsequent subframe. If the CCA fails, for example by determining that the channel is busy at step 415, wireless device 135-g may transmit on a managed RF spectrum band instead of the shared RF spectrum band.

Prior to transmitting on a managed band, wireless device 135-g may transmit a silencing signal to neighboring wireless devices 135 and UEs 115 at step 420. The silencing signal may be received and decoded by wireless device 135-h and UE 115-c. In some cases, the silencing signal comprises a multi-tone OFDM signal, a PN signal, or a CAZAC signal. The signal may represent a single bit of information, or in some cases, may include more than one bit.

Upon receiving the silencing signal, UE 115-c may suspend UL transmissions at step 425. Suspension of transmissions from UE 115-c in the managed band may reduce possible interference for wireless device 135-g. Wireless device 135-g may then transmit to wireless device 135-h on the managed RF spectrum band.

Figure 5:
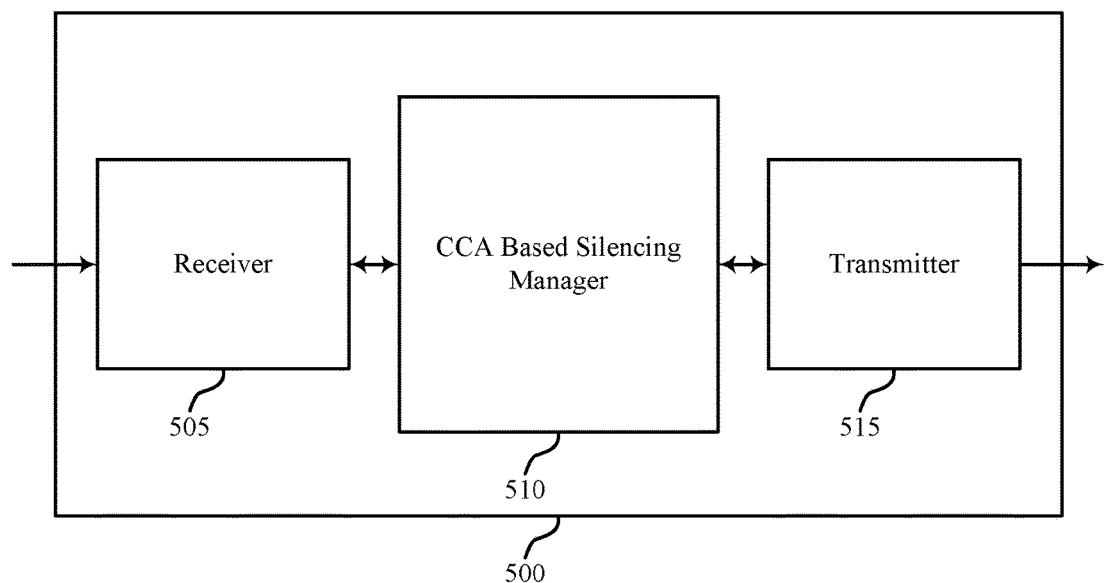
FIGS. 5 through 7 show block diagrams of wireless devices that support UE silencing based on CCA in shared spectrum in accordance with aspects of the present disclosure.

FIG. 5 shows a block diagram of a wireless device 500 that supports UE silencing based on CCA in shared spectrum in accordance with various aspects of the present disclosure. Wireless device 500 may be an example of aspects of a wireless device 135 described with reference to FIGS. 1 through 4. Wireless device 500 may include receiver 505, CCA based silencing manager 510 and transmitter 515. Wireless device 500 may also include a processor and memory. Each of these components may be in communication with each other.

The receiver 505 may receive information such as packets, user data, or control information associated with various information channels (e.g., control channels, data channels, information related to UE silencing based on CCA in shared spectrum, etc.). Information may be passed on to other components of the wireless device 500. The receiver 505 may be an example of aspects of the transceiver 825 described with reference to FIG. 8.

The CCA based silencing manager 510 may determine that a CCA in a shared RF spectrum band has failed, where a RAT operating in the shared RF spectrum band is synchronized with a RAT operating in a managed RF spectrum band, transmit a silencing signal in the managed RF spectrum band based on the determination, and transmit a message in the managed RF spectrum band based on the silencing signal. The CCA based silencing manager 510 may also be an example of aspects of the CCA based silencing manager 805 described with reference to FIG. 8.

The CCA based silencing manager 510 may also receive a silencing signal in a managed RF spectrum band, where the silencing signal is based on a determination that a CCA has failed, and where a first RAT operating in the managed RF spectrum band is synchronized with a second RAT operating in a shared RF spectrum band, and switch from receiving transmissions from a source of the silencing signal in the shared RF spectrum band to receiving transmissions from the source of the silencing signal in the managed RF spectrum band based on the silencing signal.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
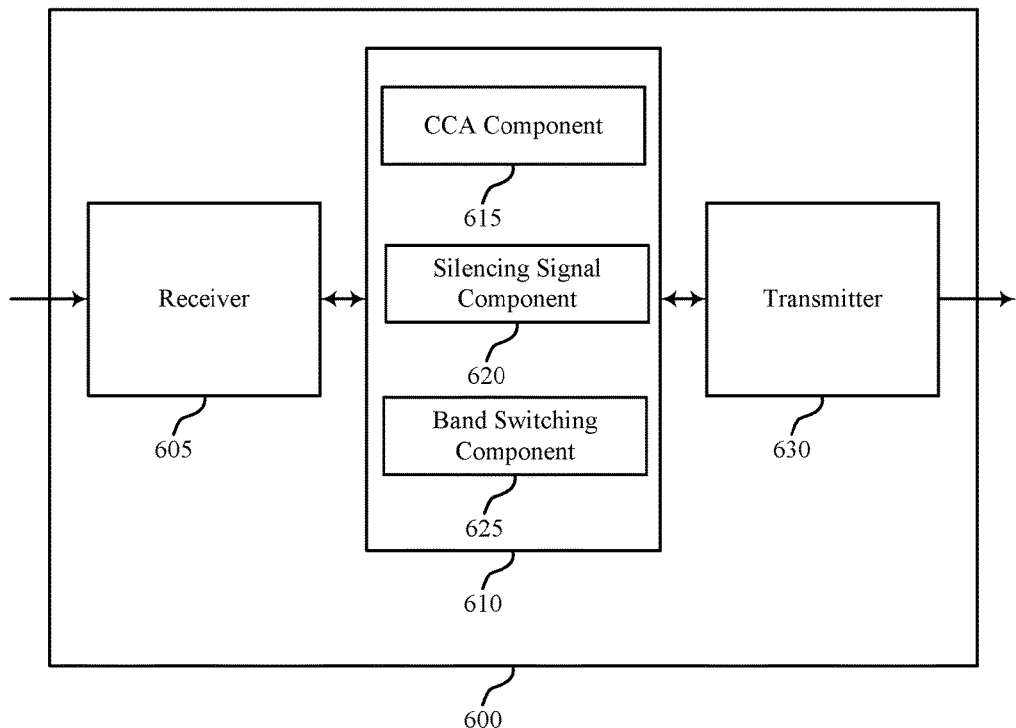

FIG. 6 shows a block diagram of a wireless device 600 that supports UE silencing based on CCA in shared spectrum in accordance with various aspects of the present disclosure. Wireless device 600 may be an example of aspects of a wireless device 500 or a wireless device 135 described with reference to FIGS. 1-5. Wireless device 600 may include receiver 605, CCA based silencing manager 610 and transmitter 630. Wireless device 600 may also include a processor and memory. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The CCA based silencing manager 610 may be an example of aspects of CCA based silencing manager 510 described with reference to FIG. 5. The CCA based silencing manager 610 may include CCA component 615, silencing signal component 620 and band switching component 625. The CCA based silencing manager 610 may be an example of aspects of the CCA based silencing manager 805 described with reference to FIG. 8.

The CCA component 615 may perform a CCA in a time slot prior to a first subframe, and determine whether a CCA in the shared RF spectrum band has failed. In some cases, the managed RF spectrum band comprises a portion of a system bandwidth of a WWAN.

The silencing signal component 620 may transmit a silencing signal in the managed RF spectrum band based on the determination that a CCA has failed, and receive a silencing signal in a managed RF spectrum band, where the silencing signal is based on a determination that a CCA has failed.

In some cases, transmitting the silencing signal in the managed RF spectrum band includes transmitting the silencing signal during a first time slot of a subframe of the managed RF spectrum band based on the determination. In some cases, the silencing signal comprises a multi-tone OFDM signal, a PN signal, or a CAZAC signal.

The band switching component 625 may switch from receiving transmissions from a source of the silencing signal in the shared RF spectrum band to receiving transmissions from the source of the silencing signal in the managed RF spectrum band based on the silencing signal, transmit a message in the managed RF spectrum band based on the silencing signal, and transmit a subsequent message in the shared RF spectrum band based on the determination that the subsequent CCA has succeeded. In some cases, the message comprises information for a mission critical application or for a control application.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize more than one antenna.

Figure 7:
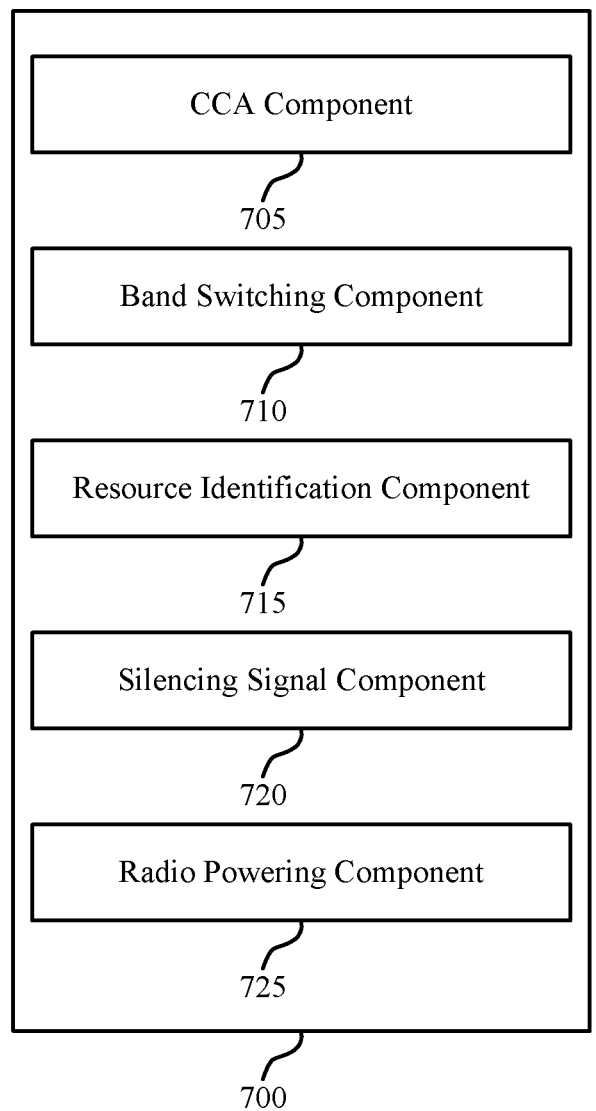

FIG. 7 shows a block diagram of a CCA based silencing manager 700 which may be an example of the corresponding component of wireless device 500 or wireless device 600. That is, CCA based silencing manager 700 may be an example of aspects of CCA based silencing manager 510 or CCA based silencing manager 610 described with reference to FIGS. 5 and 6. The CCA based silencing manager 700 may also be an example of aspects of the CCA based silencing manager 805 described with reference to FIG. 8.

The CCA based silencing manager 700 may include CCA component 705, band switching component 710, resource identification component 715, silencing signal component 720 and radio powering component 725. Each of these modules may communicate, directly or indirectly, with one another (e.g., via one or more buses).

The CCA component 705 may perform a CCA in a time slot prior to a first subframe, and determine whether a CCA in the shared RF spectrum band has failed.

The band switching component 710 may switch from receiving transmissions from a source of the silencing signal in the shared RF spectrum band to receiving transmissions from the source of the silencing signal in the managed RF spectrum band based on the silencing signal, transmit a message in the managed RF spectrum band based on the silencing signal, and transmit a subsequent message in the shared RF spectrum band based on the determination that the subsequent CCA has succeeded.

The resource identification component 715 may identify time and frequency resources on the managed or shared band for reception or transmission of wireless signals. In some cases, time resources of the managed RF spectrum band are organized according to a TDD configuration, and the resources of the shared band may be synchronized with those of the managed band.

The silencing signal component 720 may transmit a silencing signal in the managed RF spectrum band based on the determination that a CCA has failed, and receive a silencing signal in a managed RF spectrum band, where the silencing signal is based on a determination that a CCA has failed.

The radio powering component 725 may power up or down a radio for the managed RF spectrum band.

Figure 8:
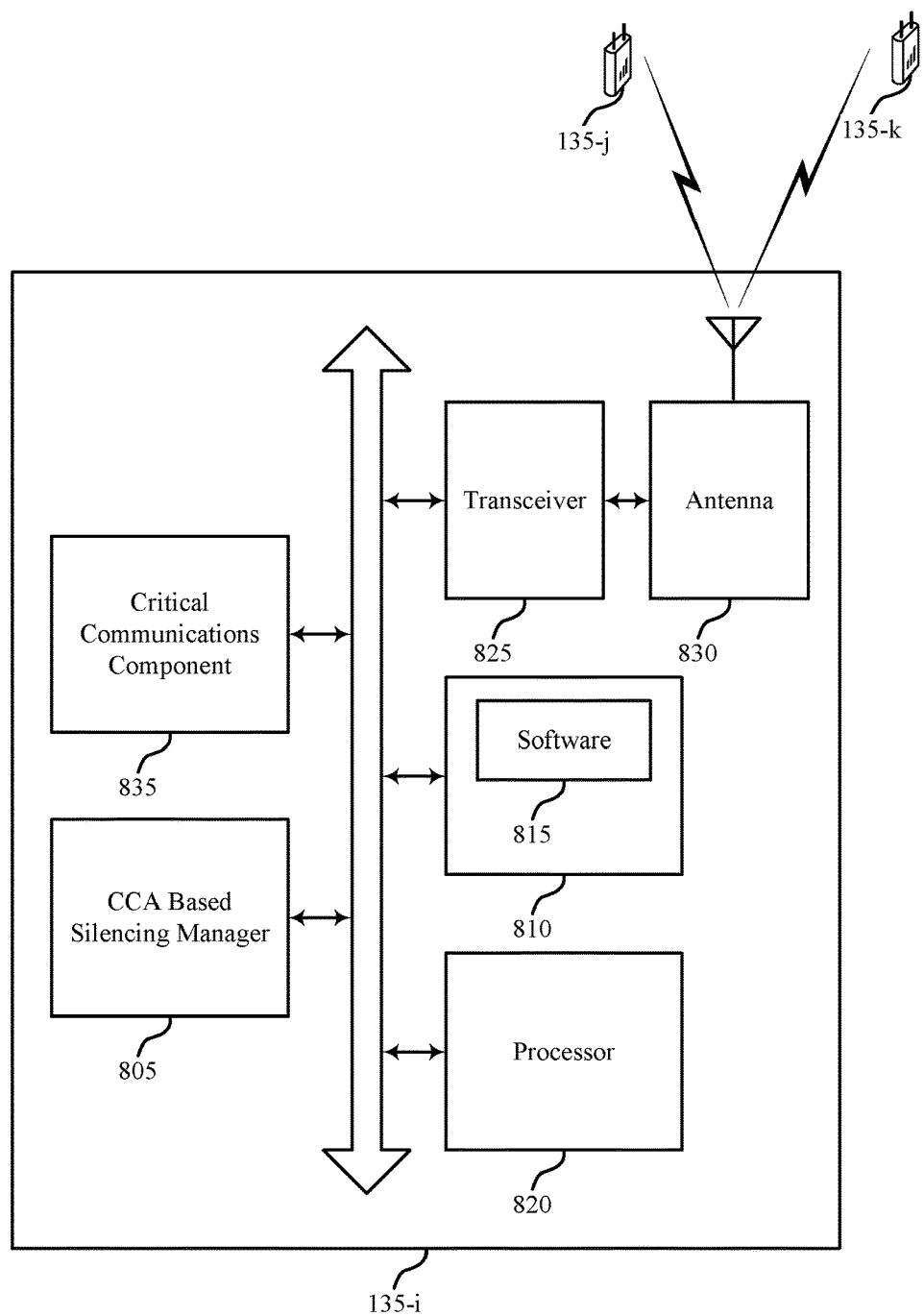
FIG. 8 illustrates a block diagram of a system including a UE that supports UE silencing based on CCA in shared spectrum in accordance with aspects of the present disclosure.

FIG. 8 shows a diagram of a system 800 including a device that supports UE silencing based on CCA in shared spectrum in accordance with various aspects of the present disclosure. For example, system 800 may include wireless device 135-i, which may be an example of a wireless device 500, a wireless device 600, or a wireless device 135 as described with reference to FIGS. 1, 2, and 5 through 7. Wireless device 135-i may communicate with other devices such as wireless device 135-j, and wireless device 135-k, which may be part of a critical information network such as a factory automation or home automation network.

Wireless device 135-c may also include CCA based silencing manager 805, memory 810, processor 820, transceiver 825, antenna 830 and critical communication component 835. Each of these modules may communicate, directly or indirectly, with one another (e.g., via one or more buses). The CCA based silencing manager 805 may be an example of a CCA based silencing manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., UE silencing based on CCA in shared spectrum, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include one of antenna 830. However, in some cases the device may have more than one of antenna 830, which may be capable of concurrently transmitting or receiving multiple wireless transmissions.

The critical communication component 835 may perform mission-critical or latency-sensitive communications, such as closed loop control communication as part of a factory or home automation network.

Figure 9:
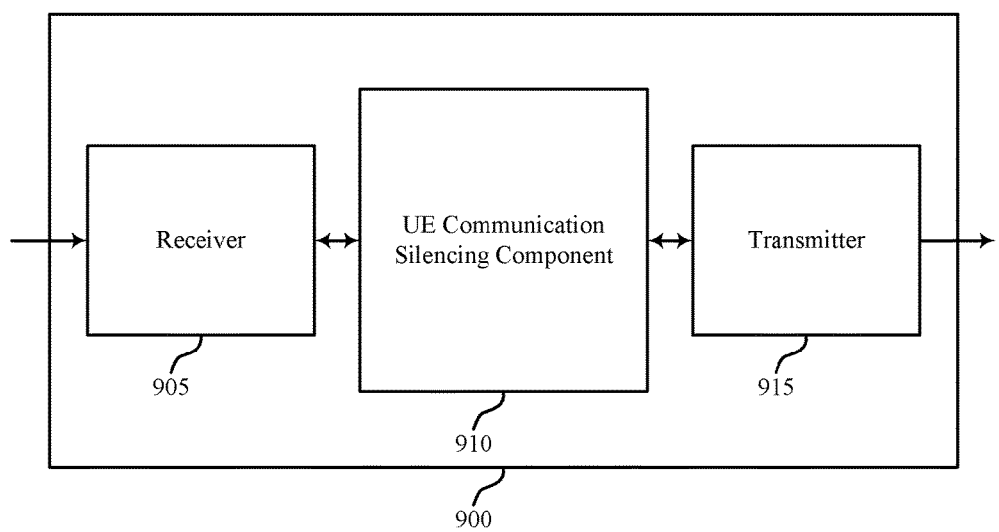
FIGS. 9 through 11 show block diagrams of wireless devices that support UE silencing based on CCA in shared spectrum in accordance with aspects of the present disclosure.

FIG. 9 shows a block diagram of a wireless device 900 that supports UE silencing based on CCA in shared spectrum in accordance with various aspects of the present disclosure. Wireless device 900 may be an example of aspects of a UE 115 described with reference to FIGS. 1 through 4. Wireless device 900 may include receiver 905, UE communication silencing manager 910 and transmitter 915. Wireless device 900 may also include a processor and memory. Each of these components may be in communication with each other.

The receiver 905 may receive information such as packets, user data, or control information associated with various information channels (e.g., control channels, data channels, and information related to UE silencing based on CCA in shared spectrum, etc.). Information may be passed on to other components of the device. The receiver 905 may be an example of aspects of the transceiver 1225 described with reference to FIG. 12.

The UE communication silencing manager 910 may identify resources for an UL transmission associated with a first RAT operating in a managed RF spectrum band, receive a silencing signal in the managed RF spectrum band during a time period including the identified resources, where the silencing signal is based on a determination that a CCA has failed, and where a second RAT operating in a shared RF spectrum band is synchronized with the first RAT operating in the managed RF spectrum band, and suspend transmission in the managed RF spectrum band during the time period based on the silencing signal. The UE communication silencing manager 910 may also be an example of aspects of the UE communication silencing manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
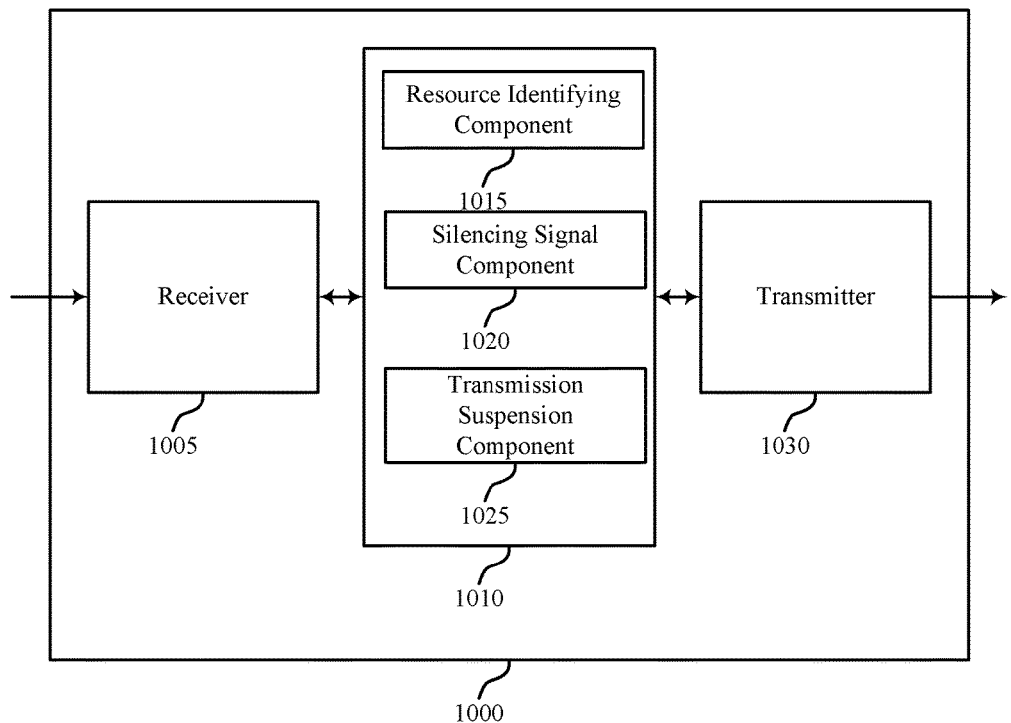

FIG. 10 shows a block diagram of a wireless device 1000 that supports UE silencing based on CCA in shared spectrum in accordance with various aspects of the present disclosure. Wireless device 1000 may be an example of aspects of a wireless device 900 or a UE 115 described with reference to FIGS. 1 through 4, and 9. Wireless device 1000 may include receiver 1005, UE communication silencing manager 1010 and transmitter 1030. Wireless device 1000 may also include a processor and memory. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The UE communication silencing manager 1010 may be an example of aspects of UE communication silencing manager 910 described with reference to FIG. 9. The UE communication silencing manager 1010 may include resource identifying component 1015, silencing signal component 1020 and transmission suspension component 1025. The UE communication silencing manager 1010 may be an example of aspects of the UE communication silencing manager 1205 described with reference to FIG. 12.

The resource identifying component 1015 may identify resources for an UL transmission associated with a RAT operating in a managed RF spectrum band.

The silencing signal component 1020 may receive a silencing signal in the managed RF spectrum band during a time period including the identified resources, where the silencing signal is based on a determination that a CCA has failed, and where a second RAT operating in a shared RF spectrum band is synchronized with the first RAT operating in the managed RF spectrum band.

The transmission suspension component 1025 may suspend transmission in the managed RF spectrum band during the time period based on the silencing signal.

The transmitter 1030 may transmit signals received from other components of wireless device 1000. In some examples, the transmitter 1030 may be collocated with a receiver in a transceiver module. For example, the transmitter 1030 may be an example of aspects of the transceiver 1225 described with reference to FIG. 12. The transmitter 1030 may utilize a single antenna, or it may utilize more than one antenna.

Figure 11:
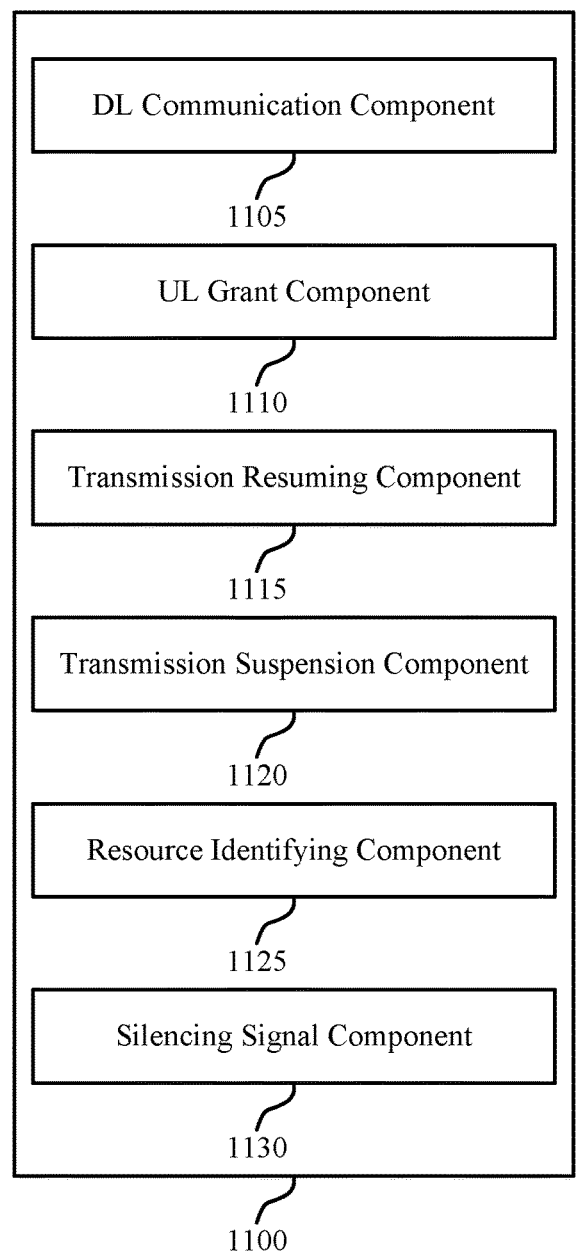

FIG. 11 shows a block diagram of a UE communication silencing manager 1100 which may be an example of the corresponding component of wireless device 900 or wireless device 1000 in accordance with various aspects of the present disclosure. That is, UE communication silencing manager 1100 may be an example of aspects of UE communication silencing manager 910 or UE communication silencing manager 1010 described with reference to FIGS. 9 and 10. The UE communication silencing manager 1100 may also be an example of aspects of the UE communication silencing manager 1205 described with reference to FIG. 12.

The UE communication silencing manager 1100 may include DL communication component 1105, UL grant component 1110, transmission resuming component 1115, transmission suspension component 1120, resource identifying component 1125 and silencing signal component 1130. Each of these modules may communicate, directly or indirectly, with one another (e.g., via one or more buses).

The DL communication component 1105 may receive a DL transmission during the time period based on the DL grant. The UL grant component 1110 may receive an UL grant, where the resources are identified based on the UL grant, and receive an UL grant for a subsequent time period.

The transmission resuming component 1115 may resume transmission in the managed RF spectrum band during the subsequent time period based on the UL grant. The transmission suspension component 1120 may suspend transmission in the managed RF spectrum band during the time period based on the silencing signal.

The resource identifying component 1125 may identify resources for an UL transmission associated with a RAT operating in a managed RF spectrum band.

The silencing signal component 1130 may receive a silencing signal in the managed RF spectrum band during a time period including the identified resources, where the silencing signal is based on a determination that a CCA has failed, and where a second RAT operating in a shared RF spectrum band is synchronized with the first RAT operating in the managed RF spectrum band.

Figure 12:
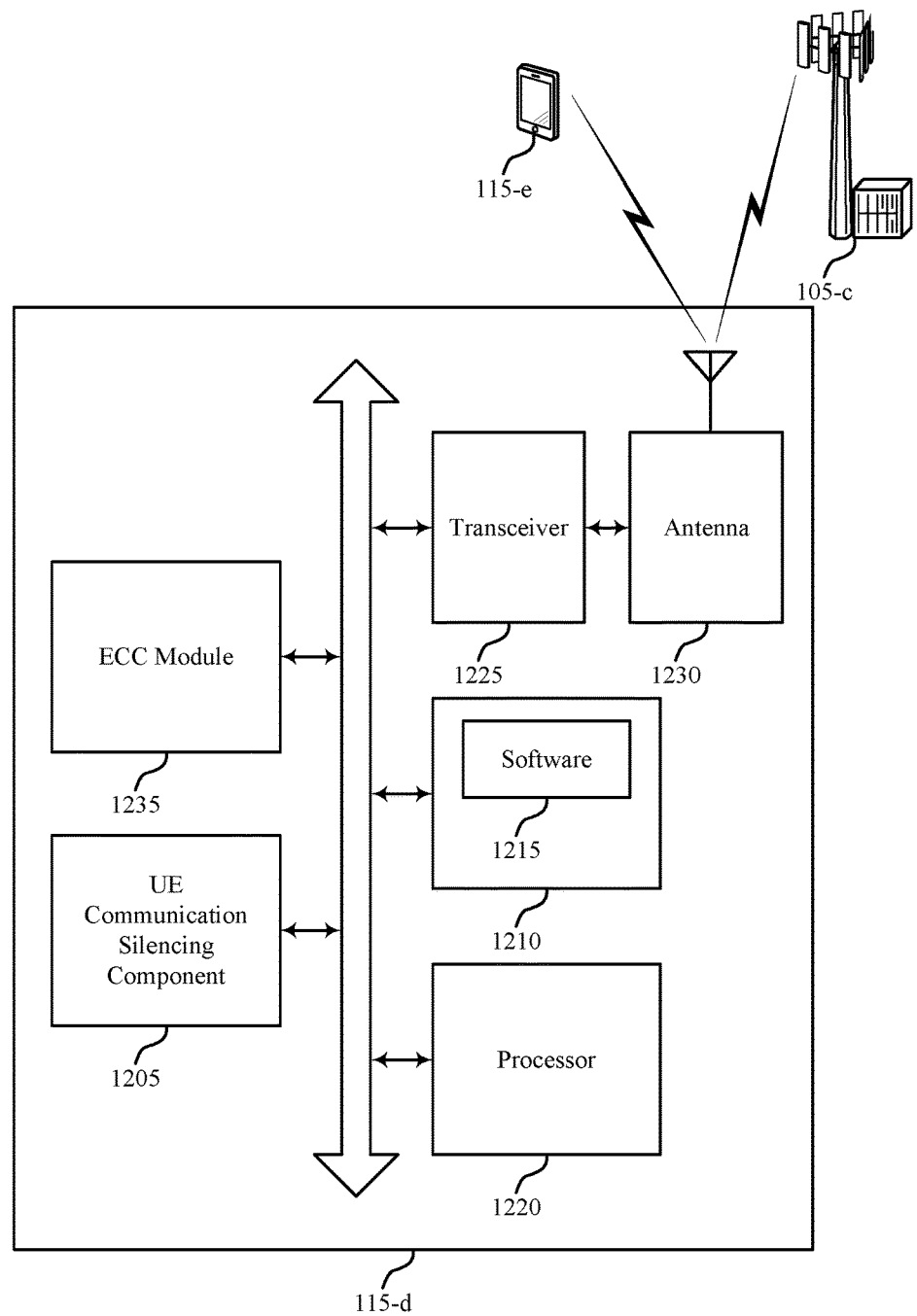
FIG. 12 illustrates a block diagram of a system including a UE that supports UE silencing based on CCA in shared spectrum in accordance with aspects of the present disclosure.

FIG. 12 shows a diagram of a system 1200 including a device that supports UE silencing based on CCA in shared spectrum in accordance with various aspects of the present disclosure. For example, system 1200 may include UE 115-d, which may be an example of a wireless device 900, a wireless device 1000, or a UE 115 as described with reference to FIGS. 1, 2, and 9 through 11.

UE 115-d may also include UE communication silencing manager 1205, memory 1210, processor 1220, transceiver 1225, antenna 1230 and ECC module 1235. Each of these modules may communicate, directly or indirectly, with one another (e.g., via one or more buses). The UE communication silencing manager 1205 may be an example of a UE communication silencing manager as described with reference to FIGS. 9 through 11.

The memory 1210 may include RAM and ROM. The memory 1210 may store computer-readable, computer-executable software including instructions that, when executed, cause the processor to perform various functions described herein (e.g., UE silencing based on CCA in shared spectrum, etc.). In some cases, the software 1215 may not be directly executable by the processor but may cause a computer (e.g., when compiled and executed) to perform functions described herein.

The processor 1220 may include an intelligent hardware device, (e.g., a CPU, a microcontroller, an ASIC, etc.) The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include one of antenna 1230. However, in some cases the device may have more than one of antenna 830, which may be capable of concurrently transmitting or receiving multiple wireless transmissions.

The ECC module 1235 may enable operations using eCCs such as communication using shared or shared spectrum, using reduced TTIs or subframe durations, or using a large number of CCs.

Figure 13:
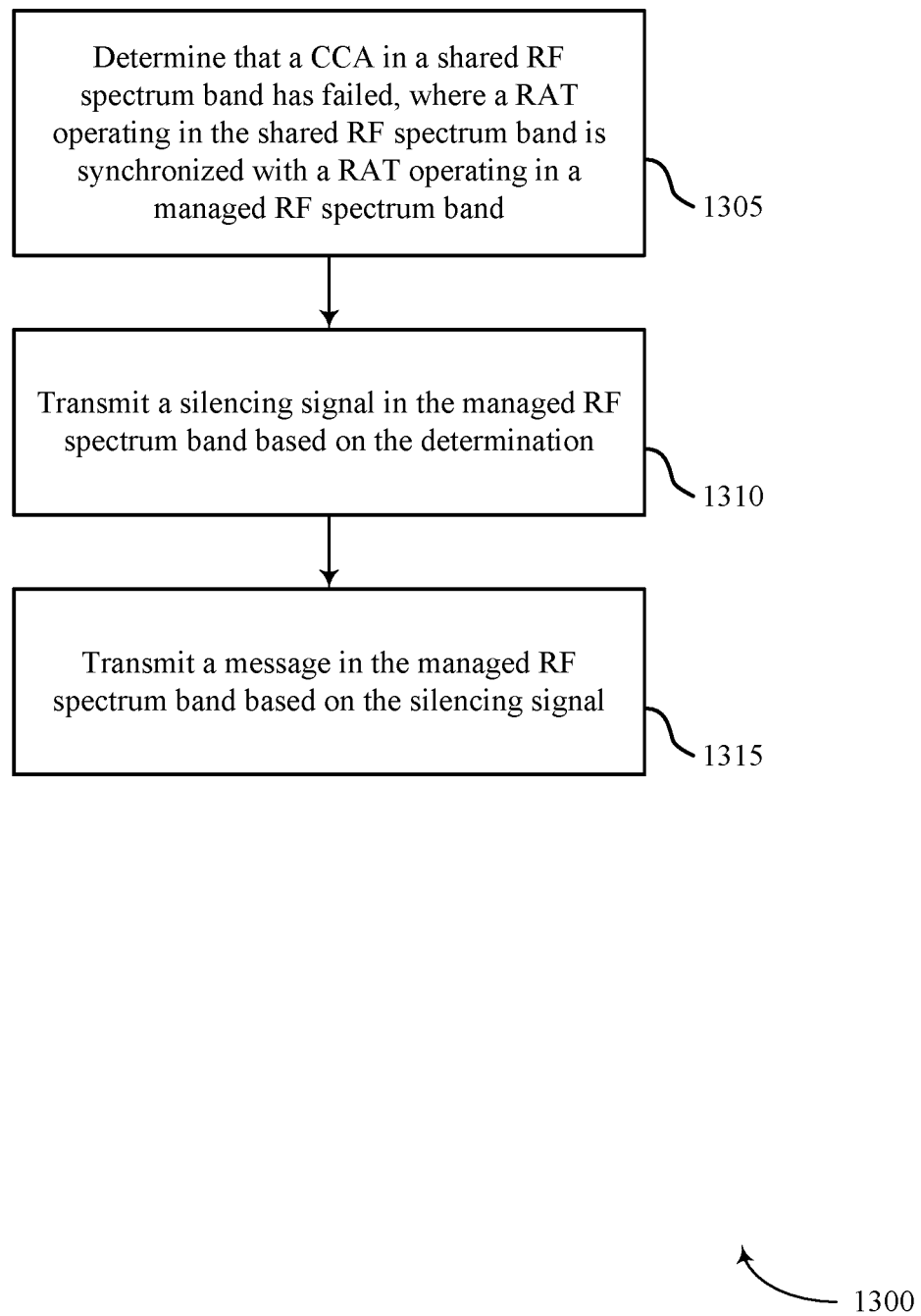
FIGS. 13 through 15 illustrate methods for UE silencing based on CCA in shared spectrum in accordance with aspects of the present disclosure.

FIG. 13 shows a flowchart illustrating a method 1300 for UE silencing based on CCA in shared spectrum in accordance with various aspects of the present disclosure. The operations of method 1300 may be implemented by a device such as a wireless device 135 or its components as described with reference to FIGS. 1 and 2. For example, the operations of method 1300 may be performed by the CCA based silencing manager as described herein. In some examples, the wireless device 135 may execute a set of codes to control the functional elements of the device to perform the functions described below. Additionally or alternatively, the wireless device 135 may perform aspects the functions described below using special-purpose hardware.

At block 1305, the wireless device 135 may determine that a CCA in a shared RF spectrum band has failed, where a RAT operating in the shared RF spectrum band is synchronized with a RAT operating in a managed RF spectrum band as described above with reference to FIGS. 2 through 4. In some examples, the operations of block 1305 may be performed by the CCA component 615 or 705 as described with reference to FIGS. 6 and 7.

At block 1310, the wireless device 135 may transmit a silencing signal in the managed RF spectrum band based on the determination as described above with reference to FIGS. 2 through 4. In some examples, the operations of block 1310 may be performed by the silencing signal component 620 or 720 as described with reference to FIGS. 6 and 7.

At block 1315, the wireless device 135 may transmit a message in the managed RF spectrum band based on the silencing signal as described above with reference to FIGS. 2 through 4. In some examples, the operations of block 1315 may be performed by the band switching component 625 or 710 as described with reference to FIGS. 6 and 7.

Figure 14:
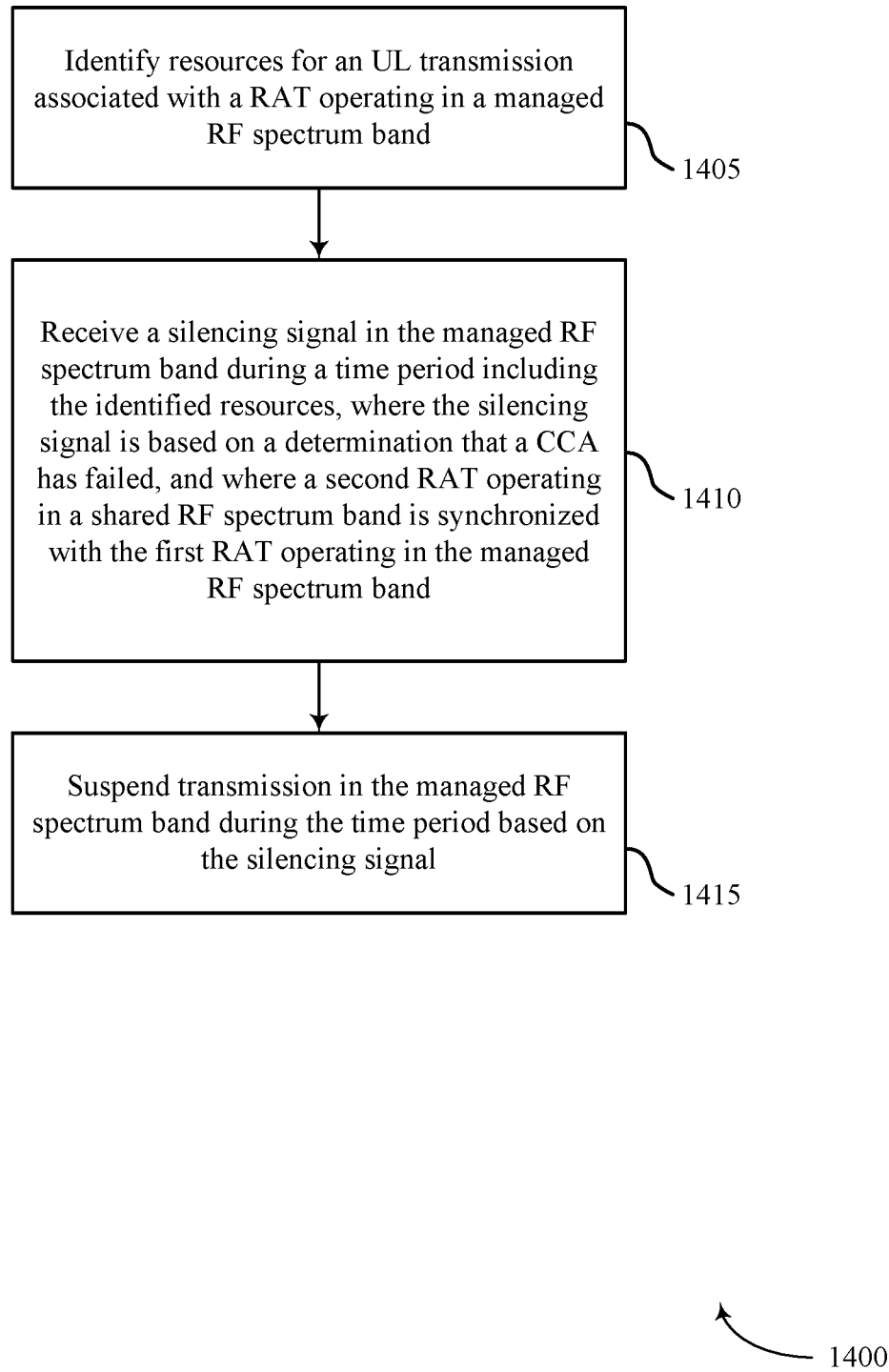

FIG. 14 shows a flowchart illustrating a method 1400 for UE silencing based on CCA in shared spectrum in accordance with various aspects of the present disclosure. The operations of method 1400 may be implemented by a device such as a UE 115 or its components as described with reference to FIGS. 1 and 2. For example, the operations of method 1400 may be performed by the UE communication silencing manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may identify resources for an UL transmission associated with a RAT operating in a managed RF spectrum band as described above with reference to FIGS. 2 through 4. In some examples, the operations of block 1405 may be performed by the resource identifying component 1015 or 1125 as described with reference to FIGS. 10 and 11.

At block 1410, the UE 115 may receive a silencing signal in the managed RF spectrum band during a time period including the identified resources, where the silencing signal is based on a determination that a CCA has failed, and where a second RAT operating in a shared RF spectrum band is synchronized with the first RAT operating in the managed RF spectrum band as described above with reference to FIGS. 2 through 4. In some examples, the operations of block 1410 may be performed by the silencing signal component 1020 or 1130 as described with reference to FIGS. 10 and 11.

At block 1415, the UE 115 may suspend transmission in the managed RF spectrum band during the time period based on the silencing signal as described above with reference to FIGS. 2 through 4. In some examples, the operations of block 1415 may be performed by the transmission suspension component as described with reference to FIGS. 10 and 11.

Figure 15:
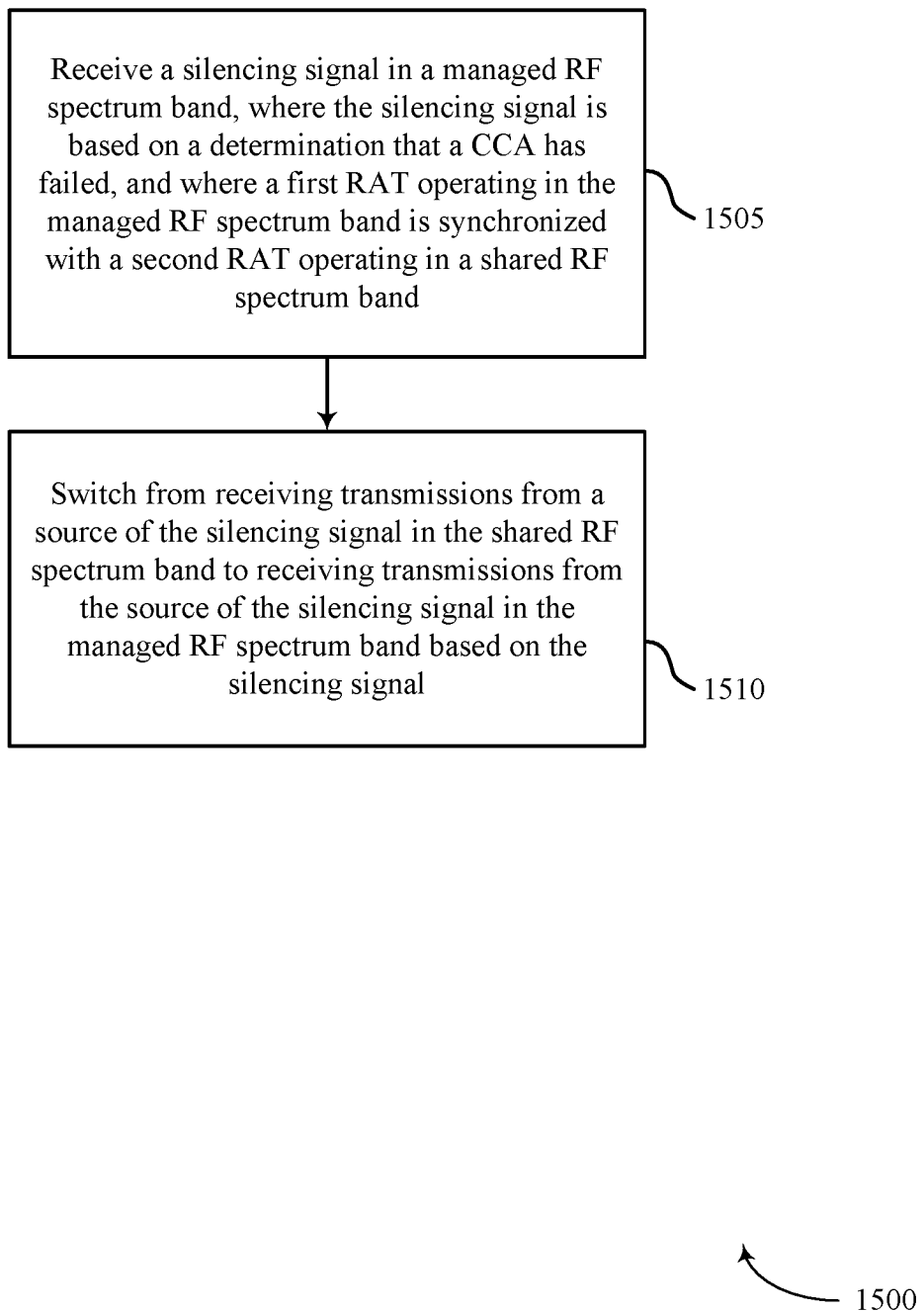

FIG. 15 shows a flowchart illustrating a method 1500 for UE silencing based on CCA in shared spectrum in accordance with various aspects of the present disclosure. The operations of method 1500 may be implemented by a device such as a wireless device 135 or its components as described with reference to FIGS. 1 and 2. For example, the operations of method 1500 may be performed by the CCA based silencing manager as described herein. In some examples, the wireless device 135 may execute a set of codes to control the functional elements of the device to perform the functions described below. Additionally or alternatively, the wireless device 135 may perform aspects the functions described below using special-purpose hardware.

At block 1505, the wireless device 135 may receive a silencing signal in a managed RF spectrum band, where the silencing signal is based on a determination that a CCA has failed, and where a first RAT operating in the managed RF spectrum band is synchronized with a second RAT operating in a shared RF spectrum band as described above with reference to FIGS. 2 through 4. In some examples, the operations of block 1505 may be performed by the silencing signal component 620 or 720 as described with reference to FIGS. 6 and 7.

At block 1510, the wireless device 135 may switch from receiving transmissions from a source of the silencing signal in the shared RF spectrum band to receiving transmissions from the source of the silencing signal in the managed RF spectrum band based on the silencing signal as described above with reference to FIGS. 2 through 4. In some examples, the operations of block 1510 may be performed by the band switching component 625 or 710 as described with reference to FIGS. 6 and 7.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for UE silencing based on CCA in shared spectrum.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA (FDMA), OFDMA (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., shared, managed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for UE silencing based on CCA in shared spectrum. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

What is claimed is:

1. A method of wireless communication comprising:
determining, by a wireless device, a clear channel assessment (CCA) in a shared radio frequency (RF) spectrum band has failed, wherein a radio access technology (RAT) operating in the shared RF spectrum band is synchronized with a RAT operating in a managed RF spectrum band;
transmitting, by the wireless device, a silencing signal in the managed RF spectrum band indicating that at least one neighboring user equipment (UE) is to suspend uplink (UL) transmission in the managed RF spectrum band, wherein transmitting the silencing signal is based at least in part on the determination; and
transmitting, by the wireless device, a message in the managed RF spectrum band based at least in part on the silencing signal.

2. The method of claim 1, further comprising:
determining that a subsequent CCA in the shared RF spectrum band has succeeded after the CCA; and
transmitting a subsequent message in the shared RF spectrum band based at least in part on the determination that the subsequent CCA has succeeded.

3. The method of claim 1, further comprising:
determining that a subsequent CCA in the shared RF spectrum band has failed after the CCA;
transmitting a subsequent silencing signal in the managed RF spectrum band based at least in part on the determination that the subsequent CCA has failed; and
transmitting a subsequent message in the shared RF spectrum band based at least in part on the subsequent silencing signal.

4. The method of claim 1, further comprising:
performing the CCA in a time slot prior to a first subframe of a frame structure, wherein the message is transmitted in the first subframe.

5. The method of claim 1, wherein transmitting the silencing signal in the managed RF spectrum band comprises:
transmitting the silencing signal during a first time slot of a subframe of a frame structure of the managed RF spectrum band based at least in part on the determination.

6. The method of claim 1, wherein the silencing signal comprises a multitone orthogonal frequency division multiplexing (OFDM) signal, a pseudonoise (PN) signal, or a constant amplitude zero autocorrelation (CAZAC) signal.

7. The method of claim 1, wherein the message comprises information for a mission critical application or for a control application.

8. The method of claim 1, wherein the managed RF spectrum band comprises a portion of a system bandwidth of a wireless wide area network (WWAN).

9. The method of claim 1, wherein time resources of the managed RF spectrum band are organized according to a time division duplex (TDD) configuration.

10. A method of wireless communication comprising:
identifying, by a user equipment (UE), resources for an uplink (UL) transmission associated with a first radio access technology (RAT) operating in a managed radio frequency (RF) spectrum band, wherein the first RAT operating in the managed RF spectrum band is synchronized with a second RAT operating in a shared RF spectrum band;
receiving, by the UE and from a wireless device, a silencing signal in the managed RF spectrum band indicating that at least one neighboring user equipment (UE) is to suspend UL transmission in the managed RF spectrum band, wherein receiving the silencing signal is during a time period including the identified resources, and wherein transmitting the silencing signal is based at least in part on a determination that a clear channel assessment (CCA) has failed; and
suspending, by the UE, transmission in the managed RF spectrum band during the time period based at least in part on the silencing signal.

11. The method of claim 10, further comprising:
receiving an UL grant, wherein the resources are identified based at least in part on the UL grant.

12. The method of claim 10, further comprising:
receiving a downlink (DL) transmission during the time period based at least in part on a DL grant.

13. The method of claim 10, further comprising:
receiving an UL grant for a subsequent time period; and
resuming transmission in the managed RF spectrum band during the subsequent time period based at least in part on the UL grant.

14. A method of wireless communication comprising:
receiving, by a first wireless device, a silencing signal in a managed radio frequency (RF) spectrum band indicating that at least one neighboring user equipment (UE) is to suspend uplink (UL) transmission in the managed RF spectrum band, wherein the silencing signal is based at least in part on a determination that a clear channel assessment (CCA) has failed, and wherein a first radio access technology (RAT) operating in the managed RF spectrum band is synchronized with a second RAT operating in a shared RF spectrum band; and
switching, by the first wireless device, from receiving transmissions in the shared RF spectrum band by a second wireless device to receiving transmissions in the managed RF spectrum band by the second wireless device, wherein the second wireless device is a source of the silencing signal and the switching is based at least in part on the silencing signal.

15. The method of claim 14, further comprising:
powering up a radio for the managed RF spectrum band; and
listening, using the radio, for the silencing signal in the managed RF spectrum band during a first portion of a subframe of a radio frame structure.

16. An apparatus for wireless communication comprising:
means for determining a clear channel assessment (CCA) in a shared radio frequency (RF) spectrum band has failed, wherein a radio access technology (RAT) operating in the shared RF spectrum band is synchronized with a RAT operating in a managed RF spectrum band;
means for transmitting a silencing signal in the managed RF spectrum band indicating that at least one neighboring user equipment (UE) is to suspend uplink (UL) transmission in the managed RF spectrum band, wherein transmitting the silencing signal is based at least in part on the determination; and
means for transmitting a message in the managed RF spectrum band based at least in part on the silencing signal.

17. The apparatus of claim 16, further comprising:
means for determining that a subsequent CCA in the shared RF spectrum band has succeeded after the CCA; and
means for transmitting a subsequent message in the shared RF spectrum band based at least in part on the determination that the subsequent CCA has succeeded.

18. The apparatus of claim 16, further comprising:
means for determining that a subsequent CCA in the shared RF spectrum band has failed after the CCA;
means for transmitting a subsequent silencing signal in the managed RF spectrum band based at least in part on the determination that the subsequent CCA has failed; and
means for transmitting a subsequent message in the shared RF spectrum band based at least in part on the subsequent silencing signal.

19. The apparatus of claim 16, further comprising:
means for performing the CCA in a time slot prior to a first subframe of a frame structure, wherein the message is transmitted in the first subframe.

20. The apparatus of claim 16, wherein the means for transmitting the silencing signal in the managed RF spectrum band comprises:
means for transmitting the silencing signal during a first time slot of a subframe of a frame structure of the managed RF spectrum band based at least in part on the determination.

21. The apparatus of claim 16, wherein the silencing signal comprises a multi-tone orthogonal frequency division multiplexing (OFDM) signal, a pseudo-noise (PN) signal, or a constant amplitude zero autocorrelation (CAZAC) signal.

22. The apparatus of claim 16, wherein the message comprises information for a mission critical application or for a control application.

23. The apparatus of claim 16, wherein the managed RF spectrum band comprises a portion of a system bandwidth of a wireless wide area network (WWAN).

24. The apparatus of claim 16, wherein time resources of the managed RF spectrum band are organized according to a time division duplex (TDD) configuration.

25. An apparatus for wireless communication comprising:
means for identifying resources for an uplink (UL) transmission associated with a first radio access technology (RAT) operating in a managed radio frequency (RF) spectrum band, wherein the first RAT operating in the managed RF spectrum band is synchronized with a second RAT operating in a shared RF spectrum band;
means for receiving, from a wireless device, a silencing signal in the managed RF spectrum band indicating that at least one neighboring user equipment (UE) is to suspend UL transmission in the managed RF spectrum band, wherein receiving the silencing signal is during a time period including the identified resources, and wherein the silencing signal is based at least in part on a determination that a clear channel assessment (CCA) has failed; and
means for suspending transmission in the managed RF spectrum band during the time period based at least in part on the silencing signal.

26. The apparatus of claim 25, further comprising:
means for receiving an UL grant, wherein the resources are identified based at least in part on the UL grant.

27. The apparatus of claim 25, further comprising:
means for receiving a downlink (DL) transmission during the time period based at least in part on a DL grant.

28. The apparatus of claim 25, further comprising:
means for receiving an UL grant for a subsequent time period; and
means for resuming transmission in the managed RF spectrum band during the subsequent time period based at least in part on the UL grant.

29. An apparatus for wireless communication comprising:
means for receiving, from a wireless device, a silencing signal in a managed radio frequency (RF) spectrum band indicating that at least one neighboring user equipment (UE) is to suspend uplink (UL) transmission in the managed RF spectrum band, wherein the silencing signal is based at least in part on a determination that a clear channel assessment (CCA) has failed, and wherein a first radio access technology (RAT) operating in the managed RF spectrum band is synchronized with a second RAT operating in a shared RF spectrum band; and
means for switching from receiving transmissions in the shared RF spectrum band by the wireless device to receiving transmissions in the managed RF spectrum band by the wireless device, wherein the wireless device is a source of the silencing signal and the switching is based at least in part on the silencing signal.

30. The apparatus of claim 29, further comprising:
means for powering up a radio for the managed RF spectrum band; and
means for listening, using the radio, for the silencing signal in the managed RF spectrum band during a first portion of a subframe of a radio frame structure.

31. An apparatus for wireless communication, comprising:
a processor;
memory in electronic communication with the processor; and
instructions stored in the memory and operable, when executed by the processor, to cause the apparatus to:
determine a clear channel assessment (CCA) in a shared radio frequency (RF) spectrum band has failed, wherein a radio access technology (RAT) operating in the shared RF spectrum band is synchronized with a RAT operating in a managed RF spectrum band;
transmit a silencing signal in the managed RF spectrum band indicating that at least one neighboring user equipment (UE) is to suspend uplink (UL) transmission in the managed RF spectrum band, wherein transmitting the silencing signal is based at least in part on the determination; and
transmit a message in the managed RF spectrum band based at least in part on the silencing signal.

32. The apparatus of claim 31, wherein the instructions are further operable to cause the processor to:
determine that a subsequent CCA in the shared RF spectrum band has succeeded after the CCA; and
transmit a subsequent message in the shared RF spectrum band based at least in part on the determination that the subsequent CCA has succeeded.

33. The apparatus of claim 31, wherein the instructions are further operable to cause the processor to:
determine that a subsequent CCA in the shared RF spectrum band has failed after the CCA;
transmit a subsequent silencing signal in the managed RF spectrum band based at least in part on the determination that the subsequent CCA has failed; and
transmit a subsequent message in the shared RF spectrum band based at least in part on the subsequent silencing signal.

34. The apparatus of claim 31, wherein the instructions are further operable to cause the processor to:
perform the CCA in a time slot prior to a first subframe of a frame structure, wherein the message is transmitted in the first subframe.

35. An apparatus for wireless communication, comprising:
a processor;
memory in electronic communication with the processor; and
instructions stored in the memory and operable, when executed by the processor, to cause the apparatus to:
identify resources for an uplink (UL) transmission associated with a first radio access technology (RAT) operating in a managed radio frequency (RF) spectrum band, wherein the first RAT operating in the managed RF spectrum band is synchronized with a second RAT operating in a shared RF spectrum band;
receive, from a wireless device, a silencing signal in the managed RF spectrum band indicating that at least one neighboring user equipment (UE) is to suspend UL transmission in the managed RF spectrum band, wherein receiving the silencing signal is during a time period including the identified resources, and wherein the silencing signal is based at least in part on a determination that a clear channel assessment (CCA) has failed; and
suspend transmission in the managed RF spectrum band during the time period based at least in part on the silencing signal.

36. The apparatus of claim 35, wherein the instructions are further operable to cause the processor to:
receive an UL grant, wherein the resources are identified based at least in part on the UL grant.

37. The apparatus of claim 35, wherein the instructions are further operable to cause the processor to:
receive a downlink (DL) transmission during the time period based at least in part on a DL grant.

38. The apparatus of claim 35, wherein the instructions are further operable to cause the processor to:
receive an UL grant for a subsequent time period; and
resume transmission in the managed RF spectrum band during the subsequent time period based at least in part on the UL grant.

39. An apparatus for wireless communication, comprising:
a processor;
memory in electronic communication with the processor; and
instructions stored in the memory and operable, when executed by the processor, to cause the apparatus to:
receive, from a wireless device, a silencing signal in a managed radio frequency (RF) spectrum band indicating that at least one neighboring user equipment (UE) is to suspend uplink (UL) transmission in the managed RF spectrum band, wherein the silencing signal is based at least in part on a determination that a clear channel assessment (CCA) has failed, and wherein a first radio access technology (RAT) operating in the managed RF spectrum band is synchronized with a second RAT operating in a shared RF spectrum band; and switch from receiving transmissions in the shared RF spectrum band by the wireless device to receiving transmissions in the managed RF spectrum band by the wireless device, wherein the wireless device is a source of the silencing signal and the switching is based at least in part on the silencing signal.

40. The apparatus of claim 39, wherein the instructions are further operable to cause the processor to:

power up a radio for the managed RF spectrum band; and listen, using the radio, for the silencing signal in the managed RF spectrum band during a first portion of a subframe of a radio frame structure.

41. A non-transitory computer-readable medium storing code for wireless communication, the code comprising instructions executable to:

determine a clear channel assessment (CCA) in a shared radio frequency (RF) spectrum band has failed, wherein a radio access technology (RAT) operating in the shared RF spectrum band is synchronized with a RAT operating in a managed RF spectrum band;

transmit a silencing signal in the managed RF spectrum band indicating that at least one neighboring user equipment (UE) is to suspend uplink (UL) transmission in the managed RF spectrum band, wherein transmitting the silencing signal is based at least in part on the determination; and transmit a message in the managed RF spectrum band based at least in part on the silencing signal.

42. A non-transitory computer-readable medium storing code for wireless communication, the code comprising instructions executable to:

identify resources for an uplink (UL) transmission associated with a first radio access technology (RAT) operating in a managed radio frequency (RF) spectrum band, wherein the first RAT operating in the managed RF spectrum band is synchronized with a second RAT operating in a shared RF spectrum band;

receive, from a wireless device, a silencing signal in the managed RF spectrum band indicating that at least one neighboring user equipment (UE) is to suspend UL transmission in the managed RF spectrum band, wherein receiving the silencing signal is during a time period including the identified resources, and wherein the silencing signal is based at least in part on a determination that a clear channel assessment (CCA) has failed; and suspend transmission in the managed RF spectrum band during the time period based at least in part on the silencing signal.

43. A non-transitory computer-readable medium storing code for wireless communication, the code comprising instructions executable to:

receive, from a wireless device, a silencing signal in a managed radio frequency (RF) spectrum band indicating that at least one neighboring user equipment (UE) is to suspend uplink (UL) transmission in the managed RF spectrum band, wherein the silencing signal is based at least in part on a determination that a clear channel assessment (CCA) has failed, and wherein a first radio access technology (RAT) operating in the managed RF spectrum band is synchronized with a second RAT operating in a shared RF spectrum band; and switch from receiving transmissions in the shared RF spectrum band by the wireless device to receiving transmissions in the managed RF spectrum band by the wireless device, wherein the wireless device is a source of the silencing signal and the switching is based at least in part on the silencing signal.

44. The method of claim 1, wherein at least a portion the silencing signal is transmitted during a period of time during which a base station transmits downlink (DL) control signaling.

* * * * *